US007990429B2

(12) United States Patent
Saito

(10) Patent No.: US 7,990,429 B2
(45) Date of Patent: Aug. 2, 2011

(54) IMAGING DEVICE WITH BLUR ENHANCEMENT

(75) Inventor: Ikuya Saito, Kawasaki (JP)

(73) Assignee: Nikon Corporation, Tokyo (JP)

( * ) Notice: Subject to any disclaimer, the term of this patent is extended or adjusted under 35 U.S.C. 154(b) by 606 days.

(21) Appl. No.: 12/084,042

(22) PCT Filed: Oct. 25, 2006

(86) PCT No.: PCT/JP2006/321238
§ 371 (c)(1),
(2), (4) Date: Apr. 24, 2008

(87) PCT Pub. No.: WO2007/049634
PCT Pub. Date: May 3, 2007

(65) Prior Publication Data
US 2009/0096897 A1    Apr. 16, 2009

(30) Foreign Application Priority Data

Oct. 28, 2005   (JP) ................................. 2005-315395
Oct. 28, 2005   (JP) ................................. 2005-315396

(51) Int. Cl.
*H04N 5/228* (2006.01)
(52) U.S. Cl. ..................................... 348/222.1; 348/239
(58) Field of Classification Search ............... 348/222.1, 348/239, 345
See application file for complete search history.

(56) References Cited

U.S. PATENT DOCUMENTS

| 6,157,733 | A | 12/2000 | Swain |
| 6,900,840 | B1 | 5/2005 | Schinner et al. |
| 6,900,841 | B1 | 5/2005 | Mihara et al. |
| 7,657,171 | B2 * | 2/2010 | Sundstrom .................... 348/345 |
| 2001/0013895 | A1 | 8/2001 | Aizawa et al. |
| 2002/0082081 | A1 | 6/2002 | Takeuchi |
| 2002/0140823 | A1 | 10/2002 | Sakurai et al. |
| 2003/0071905 | A1 * | 4/2003 | Yamasaki ..................... 348/239 |
| 2005/0195317 | A1 * | 9/2005 | Myoga ......................... 348/370 |
| 2005/0253853 | A1 * | 11/2005 | Sayre et al. ................... 345/474 |

FOREIGN PATENT DOCUMENTS

| EP | 1 217 584 A2 | 6/2002 |
| JP | A-10-010595 | 1/1998 |
| JP | A-11-041512 | 2/1999 |

(Continued)

OTHER PUBLICATIONS

Supplementary European Search Report issued in Application 06 82 2215; Dated Aug. 24, 2010.

*Primary Examiner* — Gevell Selby
(74) *Attorney, Agent, or Firm* — Oliff & Berridge, PLC

(57) ABSTRACT

An imaging device includes an imaging section, an image segmenting section, and a blur enhancement section. The imaging section images a field to generate photographic image data. The image segmenting section partitions an image of the photographic image data into a first region that is a main subject region and a second region where the main subject is not included. The blur detecting section detects degree of blur of an image of the second region of the image of the photographic image data. The blur enhancement section performs blur enhancement processing on the image of the second region to enlarge the degree of blur of the image after image processing in proportion to the magnitude of the detected degree of blur of the image.

24 Claims, 19 Drawing Sheets

FOREIGN PATENT DOCUMENTS

| | | |
|---|---|---|
| JP | A-11-266388 | 9/1999 |
| JP | A-2000-307935 | 11/2000 |
| JP | A-2002-010126 | 1/2002 |
| JP | A-2003-087545 | 3/2003 |
| JP | A-2004-207985 | 7/2004 |
| JP | A-2005-109757 | 4/2005 |
| JP | A-2005-136727 | 5/2005 |
| JP | A-2006-094419 | 4/2006 |

* cited by examiner (a) : POINT SPREAD FUNCTION (BLUR IS SMALL)

(b) : POINT SPREAD FUNCTION (BLUR IS LARGE)

FIRST PHOTOGRAPHIC IMAGE DATA
(SHOOTING WITH EMITTING LIGHT)

SECOND PHOTOGRAPHIC IMAGE DATA
(SHOOTING WITHOUT EMITTING LIGHT)

RESULT OF IMAGE SEGMENTATION DEPENDING ON
DIFFERENCE IN BRIGHTNESS OR RATIO IN BRIGHTNESS

IMAGING DEVICE WITH BLUR ENHANCEMENT

CROSS-REFERENCE TO RELATED APPLICATION

This application is a U.S. National Stage application claiming the benefit of prior filed International Application Number PCT/JP2006/321238 filed Oct. 25, 2006, in which the International Application claims a priority date of Oct 28,2005 based on prior filed Japanese Application Numbers 2005-315395 and 2005-315396, the entire contents of which are incorporated herein by reference.

TECHNICAL FIELD

The present invention relates to an imaging device etc. which images a field to generate photographic image data.

BACKGROUND ART

In portrait shooting or in close-up shooting of plants etc., photographic expression where a main subject is risen up by intentional blurring of the foreground or the background thereof, has been generally preferred. When such photographic expression is used, shooting is performed in a state where depth of the field is very shallow and the main subject is focused. Here, the depth of the field is determined depending on optical elements such as the aperture or the focal-length of a lens.

On the other hand, the size of the exposure plane of an image sensor of a commonly used electronic camera is remarkably small as compared with that of the exposure plane (film) of a so-called silver salt camera. For this reason, if the same field angle as that of the silver salt camera is intended to be obtained, the focal-length of a shooting lens of a digital camera will be shorter than that of a shooting lens of the silver salt camera. Moreover, since a shooting lens with a large aperture diameter is large and expensive, in commonly used electronic cameras, a shooting lens with a small aperture diameter is used in many cases. Therefore, the depth of field of a commonly used electronic camera tends to be deeper than that of the silver salt camera, thus, in many cases, it is difficult for the common electronic camera to make photographic expression utilizing a blurring effect as mentioned above.

Therefore, technologies for generating a portrait photographic tone image by way of digital image processing have been disclosed in Patent Document 1 and Patent Document 2.

However, in the technology of Patent Document 1 mentioned above, blurs of subjects except for a main subject are emphasized depending on the distances between each of the subjects and the camera by measuring distances of a plurality of places for one shooting. Therefore, there has been a room for improvement in that a distance measuring units capable of measuring a plurality of places is required, thus resulting in complicated camera configuration.

On the other hand, in the technology of Patent Document 2 mentioned above, a contrast ratio is obtained from images having different focal-depths obtained via a plurality of optical shooting systems, and, based on the contrast ratio, a parameter of a low pass filter for adding an electrical blur is set. However, in order to obtain the images having different focal-depths, a plurality of optical shooting systems is required. For this reason, there has been a room for improvement in that camera configuration becomes complicated and large in size.

Moreover, in order to attain miniaturization of a camera, when the above operation is intended to be achieved by a camera having one optical shooting system, it is necessary that, while maintaining a focused state, shooting is performed twice by changing an aperture value, and each of the photographic images is subjected to processing. Therefore, there is a problem of processing time.

Patent Document 1: Japanese Unexamined Patent Application Publication No. H 11-266 388

Patent Document 2: Japanese Unexamined Patent Application Publication No. 2002-101 26

DISCLOSURE

Problems to be Solved

The present invention has a purpose of solving at least one of the above mentioned problems. One of the objects of the present invention is to provide units capable of generating a portrait photographing tone image by way of image processing with a more simplified configuration in an electronic camera. Moreover, another of the objects of the present invention is to provide units capable of shortening image processing time during shooting, and generating a portrait photographic tone image by way of image processing with a more simplified configuration.

Means for Solving the Problems

An imaging device in accordance with a first invention includes an imaging section, an image segmenting section, a blur detecting section, and a blur enhancement section. The imaging section images a field to generate photographic image data. The image segmenting section partitions the image of the photographic image data into a first region where a main subject is located and a second region where the main subject is not included. The blur detecting section detects degree of blur of an image of the second region of the image of the photographic image data. The blur enhancement section performs blur enhancement process on the image of the second region to enlarge the degree of blur of the image after image processing depending on the magnitude of the detected degree of blur of the image.

For a second invention, in the first invention, the imaging device further includes a lens information obtaining section and a blur adjusting section. The lens information obtaining section obtains focal-length information of a lens of the imaging section. The blur adjusting section adjusts the degree of blur of the image of the second region depending on the focal-length information.

For a third invention, in the first invention, the imaging device further includes a blur adjusting section. The blur adjusting section detects the size of a subject in the second region, and adjusts the degree of blur of the image of the second region depending on the size of the subject.

For a fourth invention, in any one of the first invention to the third invention, the image segmenting section, based on at least one of position information of a focusing area selected at the time of shooting and information of a construct assisting frame used for positioning a main subject at the time of shooting, specifies the position of the main subject.

In a fifth invention, in any one of the first invention to the fourth invention, the image segmenting section, based on the degree of blur, further segments the image of the second region into a plurality of regions. The blur enhancement section performs the blur enhancement processing independently on images of each of the segmented regions in the second region, respectively.

For a sixth invention, in any one of the first invention to the fifth invention, the blur detecting section further includes an analyzing section which performs spatial frequency analysis of an image, and detects the degree of blur of the image at the second region by way of the spatial frequency analysis by the analyzing section.

For a seventh invention, in the sixth invention, the imaging device includes a compression section which compresses data of the image based on the result of the spatial frequency analysis of the analyzing section, and a recording section which records the compressed data output from the compression section.

For an eighth invention, in the sixth invention, the imaging device further includes an edge extracting section which extracts the edge portion in the image of the photographic image data. The blur detecting section, based on the result of the spatial frequency analysis for the edge portion, detects the degree of blur of the image at the second region.

For a ninth invention, in any one of the first invention to the eighth invention, the imaging device further includes an emitting section which emits light toward a field. The imaging section generates first photographic image data shot with emitting light, and second photographic image data shot without emitting light. The image segmenting section, based on at least one of the difference in brightness or the ratio in brightness between the first photographic image data and the second photographic image data, partitions the image of the first photographic image data or the image of the second photographic image data into the first region and the second region.

For a tenth invention, in the ninth invention, the imaging device further includes a lightness correcting section which increases the lightness of the image of the second region.

For an eleventh invention, in the ninth invention or the tenth invention, the imaging device, further includes a noise reduction section which reduces the noise of the image of the second region.

For a twelfth invention, in any one of the first to eleventh inventions, the imaging device further includes a contrast enhancement processing section which enhances the contrast of the image of the first region.

An imaging device in accordance with a thirteenth invention includes an imaging section, an image segmenting section, and an image processing section. The imaging section images a field to generate photographic image data. The image segmenting section calculates a spatial frequency component over the entire region of the photographic image of one frame obtained by the imaging section, partitions the photographic image of one frame into a first region that is a main subject region and a second region where the main subject is not included, to obtain region segmentation information based on a comparison result when the calculated spatial frequency component is compared with a predetermined value, and segments the image of the photographic image data based on the region segmentation information. The image processing section performs processing on the photographic image data of the regions segmented by the image segmenting section.

For a fourteenth invention, in the thirteenth invention, the imaging section images a field to generate main photographic image data at the time of releasing, and generates moving image data at the time of waiting the main shooting. Moreover, the image segmenting section obtains region segmentation information based on the moving image data.

For a fifteenth invention, in the fourteenth invention, the image segmenting section obtains the region segmentation information based on the moving image data generated just before the main shooting.

For a sixteenth invention, in the fourteenth invention, the imaging device further includes a compression circuit which compresses data amount of the main photographic image data imaged at the time of the main shooting. Moreover, the image segmenting section calculates the spatial frequency component of the moving image using the compression circuit.

For a seventeenth invention, in the fourteenth invention, the image processing section, based on the spatial frequency component of the image of the second region in the moving image data, determines the degree of blur of the image of the region, and depending on the magnitude of the degree of blur, suppresses a high spatial frequency component on the corresponding region so as to enlarge the degree of blur of the image of the corresponding region of the main photographic image data corresponding to the second region of the moving image data.

For an eighteenth invention, in the seventeenth invention, the image segmenting section, based on the spatial frequency component of the image of the second region in the moving image data, further segments the image of the region into a plurality of regions. Moreover, the image processing section performs suppressing process of the high spatial frequency independently on a plurality of corresponding regions of the main photographic image data corresponding to each of the plurality of segmented second regions of the moving image data, respectively.

For a nineteenth invention, in the seventeenth invention or the eighteenth invention, the imaging device, further includes a contrast enhancement processing section which enhances the contrast of regions except for the corresponding regions.

An imaging device in accordance with a twentieth invention includes an imaging section, a region specifying section, and an image processing section. The imaging section images a field to generate main photographic image data at the time of releasing and generates moving image data at the time of waiting the main shooting. The region specifying section, based on the data of the moving image data, specifies a main subject region containing a main subject and a background region other than that, of the main photographic image. The image processing section performs image processing on the main photographic image data different from each other between the main subject region and the background region.

For a twenty-first invention, in the twentieth invention, the image processing section performs burring processing on the background region to enlarge the degree of blur of the image.

For a twenty-second invention, in the twentieth invention or the twenty-first invention, the imaging device further includes an emitting section which emits light toward a field. The imaging section generates data of a first moving image and a second moving image having emitting states of the emitting section different from each other. The region specifying section, based on at least one of the difference in brightness or the ratio in brightness between the first moving image and the second moving image, specifies the main subject region and the background region in the main photographic image.

Here, expression of the configurations regarding the above inventions that are converted into an image processing device, an image processing method, a recording medium, a computer program and the like, are also effective as specific forms of the present invention. In addition, the above mentioned image processing device and the like may use an image file where attached information indicating the first region and the second region are preliminarily generated.

According to one embodiment of the present invention, a portrait photographic tone image can be generated without measuring a plurality of places at the time of shooting.

Moreover, in another embodiment of the present invention, a portrait photographic tone image by way of image processing can be generated with a simpler configuration without requiring long image processing time at the time of shooting.

DETAILED DESCRIPTION OF THE EMBODIMENTS

Description of First Embodiment

Figure 1:
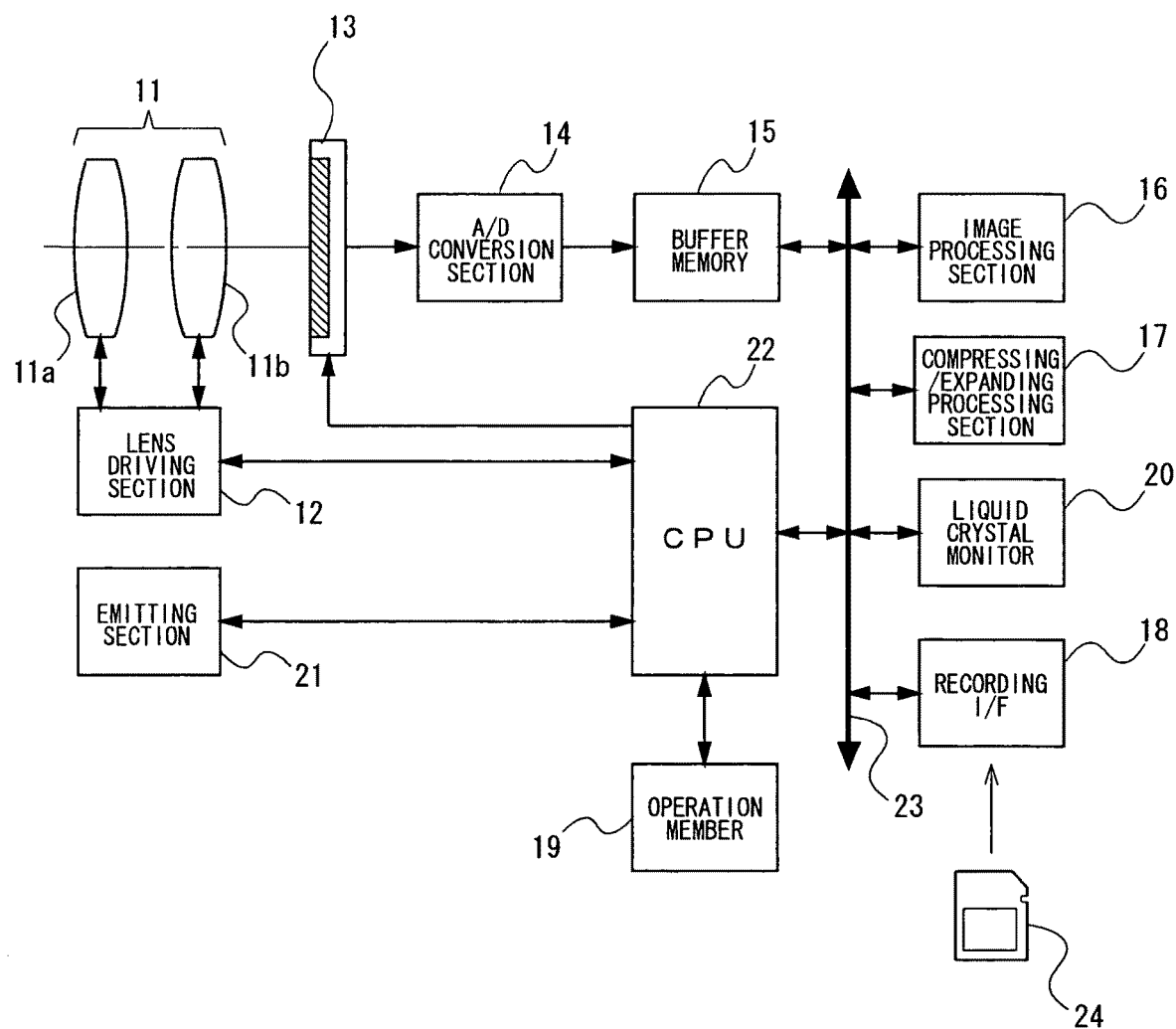
FIG. 1 is a block diagram illustrating the configuration of an electronic camera of a first embodiment.

FIG. 1 is a block diagram illustrating the configuration of an electronic camera of a first embodiment.

The electronic camera includes a shooting lens 11, a lens driving section 12, an image sensor 13, an A/D conversion section 14, a buffer memory 15, an image processing section 16, a compressing/expanding processing section 17, a recording I/F 18, an operation member 19 containing such as a release button, a liquid crystal monitor 20, an emitting section 21, a CPU 22, and a data bus 23. In addition, the buffer memory 15, the image processing section 16, the compressing/expanding processing section 17, the recording I/F 18, the liquid crystal monitor 20, and the CPU 22, are connected via the data bus 23.

The shooting lens 11 is formed with a plurality of lens groups including a zoom lens 11a and a focusing lens 11b for adjusting a focusing position. The position of the shooting lens 11 is adjusted by being driven toward an optical axis direction by the lens driving section 12. In addition, the lens driving section 12 has an encoder which detects the lens position of shooting lens 11. The lens driving section 12 outputs the focal-length information of the shooting lens 11 to the CPU 22.

The image sensor 13 performs photoelectric conversion of the light flux which passed through the shooting lens 11 to generate the analog image signal of a subject image. In addition, the image sensor 13 exposes the subject every predetermined intervals also at the time of non-release (at the time of waiting of shooting), and outputs analog image signals (moving image signals). The moving image signals are signals obtained by a moving image shooting which is a preliminary operation of the previous step of the main shooting of a still image, which images a high-resolution still image. The moving image signals are used for the below-mentioned AF operation and AE operation, generation of an image for a finder, and the like, respectively.

The A/D conversion section 14 converts analog image signals of the image sensor 13 into digital image signals The buffer memory 15 saves data temporarily at the pre-process and the post-process of image processing in the image processing section 16.

The image processing section 16 performs image processing on the digital image signals, (such as defective pixel correction, gamma correction, interpolation, color conversion, and edge enhancement), to generate photographic image data. Moreover, the image processing section 16 sequentially generates images for a finder based on the moving images. Further, in the below-mentioned "blur enhancement mode", the image processing section 16 performs various image processing, such as edge extraction processing of photographic image data, and blur enhancement processing.

The compressing/expanding processing section 17 is an ASIC which has an analyzing section and a compression section (individual illustrations of the analyzing section and the compression section are omitted). In the analyzing section of the compressing/expanding processing section 17, a spatial frequency analysis is performed on the photographic image data. Moreover, the compression section of the compressing/expanding processing section 17 performs a compressing/expanding process by way of a JPEG (Joint Photographic Experts Group) form. In addition, in the below-mentioned "blur enhancement mode", in order to detect the degree of blur of the photographic image data, an analyzing process of the spatial frequency by the analyzing section is utilized.

In addition, when the analyzing section performs the spatial frequency analysis in order to detect the degree of blur, the compression process of an image data by the compression section is not necessarily required. In other words, it is the analysis result of the spatial frequency that is required for detecting the degree of blur, and the compression process of the image data is not required. Therefore, in the case, data output by the compressing/expanding processing section 17 is not recorded on the recording medium 24 (compression data is not output to the recording medium 24 from the compressing/expanding processing section 17).

In the recording I/F 18, a connector for connecting the recording medium 24 is formed. The recording medium 24 is formed with a semiconductor memory, a small hard disk, an optical disk such as DVD, and the like, which are known. The recording medium 24 may be built in an electronic camera, or may be formed outside the electronic camera. The recording I/F 18 controls writing/reading of the photographic image data to the recording medium 24. In addition, FIG. 1 illustrates a card type recording medium with a built-in semiconductor memory as an example of the recording medium 24.

The operation member 19 is equipped with an input button, a release button, and the like. The input button of the operation member 19, receives inputs such as an input for switching the shooting modes (such as a common shooting mode, and a blur enhancement mode) of the electronic camera, a manual input of a focusing area, and an input whether a scene assist function is required or not.

Here, the "blur enhancement mode" is a mode which generates a portrait photography tone image where the main subject is risen up by blurring of the foreground or the background by way of image processing. In addition, in the "blur enhancement mode", a user can select a mode between a first mode processing the photographic image at the time of shooting and a second mode for performing image processing after shooting.

Figure 3:
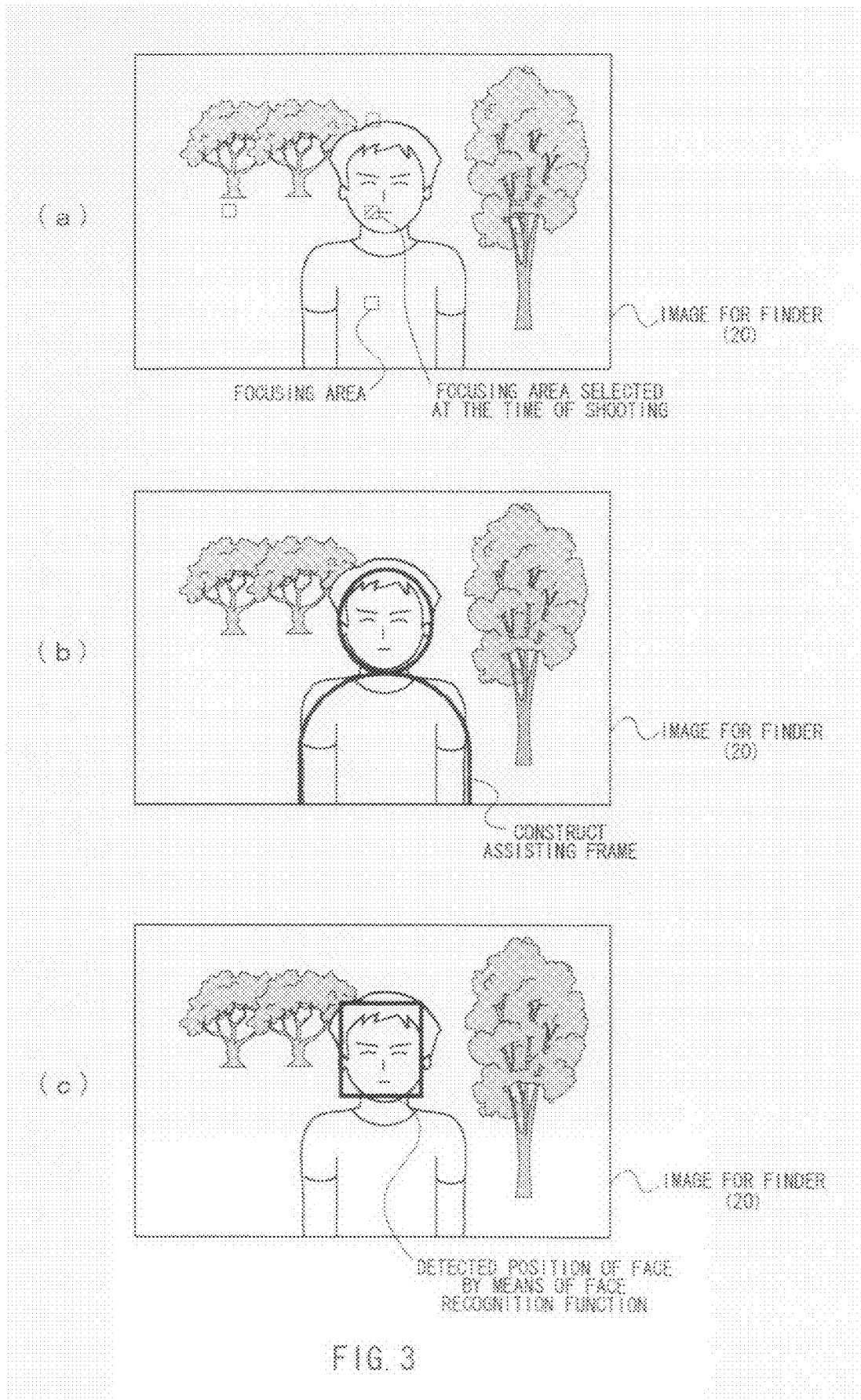
FIGS. 3(a) to 3(c) are views illustrating the determination method of a first region in the "blur enhancement mode".

The liquid crystal monitor 20 is arranged at the rear portion of the electronic camera, for example. On the liquid crystal monitor 20, a reproduction screen of the photographic image data, a setting screen for changing various settings of the electronic camera, and the like, can be displayed. Moreover, on the liquid crystal monitor 20 at the time of shooting, the image for the finder can also be displayed as a motion image. Moreover, when the above mentioned scene assist function is used, on the finder motion image of the liquid crystal monitor 20, a construct assisting frame which assists positioning of the main subject at the time of shooting is synthesized and displayed (refer to FIG. 3 (b)).

The emitting section 21 is constructed with, for example, a xenon arc tube, a main capacitor for storing the energy of emission, a reflecting umbrella and a lens member for efficiently irradiating flash onto a subject, an emission control circuit, and the like.

The CPU 22 controls the operations of each parts of the electronic camera according to a sequence program stored in a ROM which is not illustrated in figures. Moreover, the CPU 22 performs a known AF operation of a contrast method, a known AE operation, and the like, based on the moving image signal.

Figure 2:
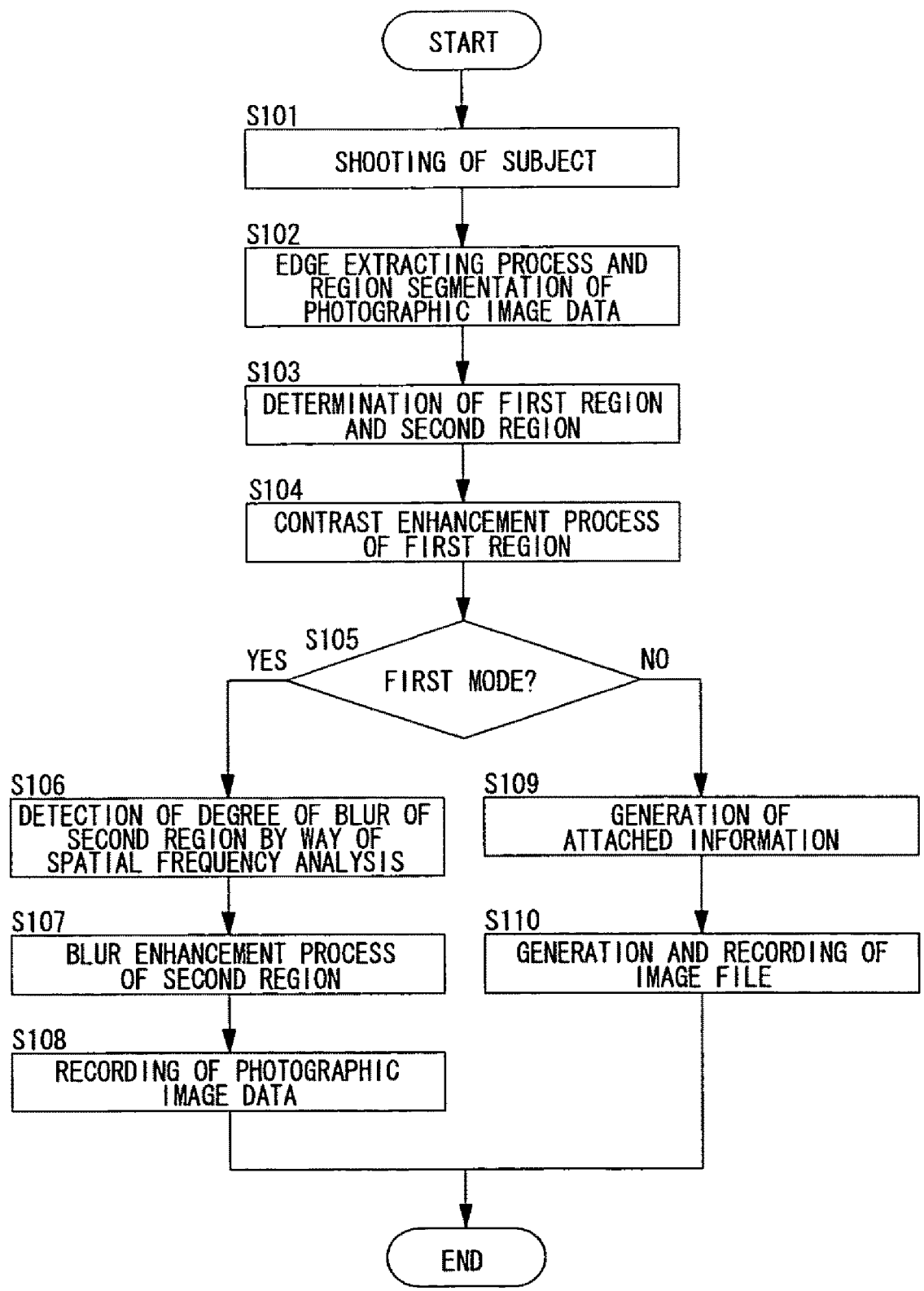
FIG. 2 is a flow chart illustrating the operation in a "blur enhancement mode" of the electronic camera of the first embodiment.

Hereinafter, with reference to the flow chart in FIG. 2, the operation in the "blur enhancement mode" of an electronic camera of a first embodiment will be described.

Step S101: A user instructs the electronic camera to perform main shooting of a still image of a subject by way of a full-pressing operation of a release button. The CPU 22 of the electronic camera images a subject image by driving the image sensor 13 at the time of releasing. Then, the image processing section 16, based on the image signal at the time of releasing, generates photographic image data. The photographic image data is temporarily recorded on the buffer memory 15. In addition, the CPU 22 records temporarily photographic information (such as the position of the focusing area, set information of the scene assist function, face recognition information, and focal-length information), on the buffer memory 15 etc.

Step S102: The CPU 22 instructs the image processing section 16 to perform an edge extracting process. The image processing section 16 performs edge extracting process on the photographic image data by way of a differential filter (such as a Laplacian filter). Then, based on the extracted edge (the outline of the image), the CPU 22 segments the image of the photographic image data into a plurality of regions.

Step S103: The CPU 22 determines the region (first region) where the main subject is located, and the other regions (second region), from the regions divided at S102. Here, the CPU 22 determines the first region by way of any one of the following methods (1) to (3) (or a plurality combination of the methods (1) to (3)).

(1) The CPU 22 determines a region where the focusing area selected at the time of shooting is located, as the first region (refer to FIG. 3(a)). It is because, in order to image while focusing the main subject, an AF operation is usually performed by selecting the focusing area where the main subject is located.

(2) When shooting is performed using the scene assist function, the CPU 22 determines the first region based on regions overlapped with the above-mentioned construct assisting frame (refer to FIG. 3(b)). It is because the main subject is considered to be located in the construct assisting frame.

For example, when there is a region having a specific color such as skin color in the overlapping regions, a region being continuous to the region is determined as the first region. Alternatively, when a region has an edge (outline) having a shape similar to the shape of the construct assisting frame near (or partially overlapped with) the construct assisting frame, the region is determined as the first region. In addition, regarding regions extending over the construct assisting frame, for example, the CPU 22 may include only such regions that contain over half pixels in the construct assisting frame in the first region.

(3) When shooting is performed using a face recognition function which recognizes human's face region, the CPU 22 determines a region where the detected face is located as the first region (refer to FIG. 3(c)). It is because, in this case, a possibility that a human is imaged as the main subject is high. Here, when information of vertical direction of the face can be obtained at the time of face recognition, the CPU 22 may also include a region located below the face in the first region. It is because, a possibility that a body of the human to be the main subject is located below the face, is high. In addition, when a plurality of faces is detected, the CPU 22 identifies a region of the nearest face as the main subject to determine the first region.

Step S104: In accordance with the instruction of the CPU 22, the image processing section 16 performs known contrast enhancement processing (tone correction etc.) on portions of the first region (S103) of the photographic image data. In addition, by the setting change of a user, in some cases, the CPU 22 may omit the contrast enhancement process at S104.

Step S105: The CPU 22 determines whether the first mode is selected or not, in the "blur enhancement mode". When the first mode is selected (YES side), the CPU 22 proceeds to S106. On the other hand, when the second mode is selected (NO side), the CPU 22 proceeds to S109.

Step S106: By way of frequency analysis using the compressing/expanding processing section 17, the CPU 22 detects the degree of blur of the second region (S103) of the photographic image data. At S106, the CPU 22 obtains the average degree of blur of the entire second region. Specifically, the CPU 22 detects the degree of blur in the following procedures (1) to (3).

(1) The CPU 22 segments the image of the photographic image data into the pixel blocks of about 8×8 pixels.

(2) In accordance with the instruction of the CPU 22, the compressing/expanding processing section 17 performs DCT transform (discrete cosine transform) processing on each of the pixel blocks contained in the second region of the photographic image data.

(3) The compressing/expanding processing section 17 obtains the DCT coefficient after the DCT transform as information of the degree of blur of the image.

Figure 4:
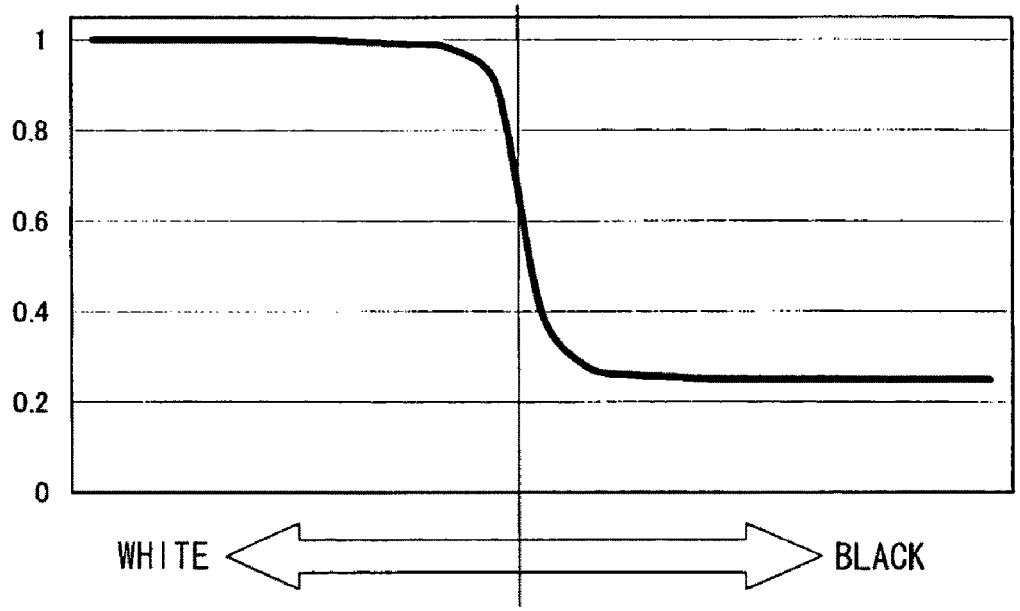
FIGS. 4(a) and 4(b) are views illustrating gradation change in the outline portion in a black and white image.
Figure 4:
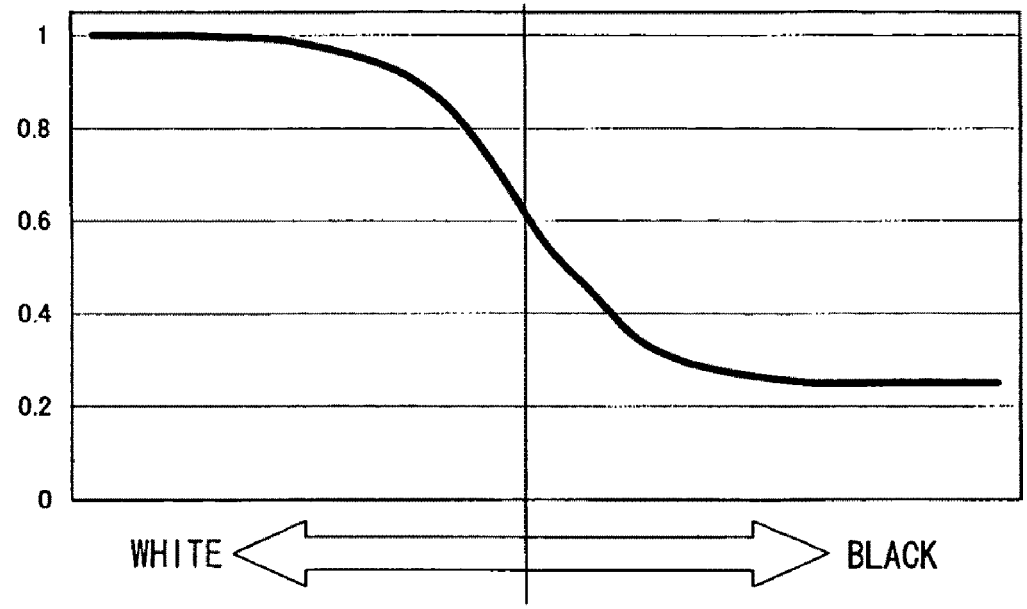

Here, the correlation between the DCT coefficient of the compressing/expanding processing section 17 and the degree of blur of the image will be described briefly. FIGS. 4(a) and 4(b) are views illustrating gradation change in the outline portion in a black and white image. As in FIG. 4(a), when the change of contrasting is sharp (image having a clear outline), the image data contains many high spatial frequency components. Therefore, the DCT coefficients corresponding to each of the frequency components after the DCT transform have values which are not zero to a high spatial frequency.

On the other hand, as in FIG. 4(b), when the change of contrasting is mild (image having a blurred outline), the image data contains less high spatial frequency components as compared to those of the case in FIG. 4(a). When the DCT transform is performed on such a blurred image data, the DCT coefficients will be zero due to the less high spatial frequency components as compared with those of the case of FIG. 4(a). Therefore, the degree of blur of an image can be determined from the distribution of the coefficients with respect to each of the frequency components after the DCT transform. The determination of the degree of blur (amount of the high spatial frequency components in the image) of the image can be performed, for example, by whether or not the sum of the coefficient values of components of spatial frequencies which are equal to or greater than a predetermined frequency, is equal to or greater than a predetermined value.

In addition, the amount of the high spatial frequency components contained in an image is influenced by the picture of the original image. Therefore, the CPU 22 may auxiliary use information, such as the color difference and the lightness of the image, as information of the degree of blur of an image. Moreover, the above-mentioned DCT transform is used as an example, and other orthogonal transform, such as wavelet transform, may be used.

Step S107: In accordance with the instruction of the CPU 22, the image processing section 16 performs blur enhancement process on the portion of the second region (S103) of the photographic image data. The blur enhancement process is executed by way of the filter operation (convolution operation) of a point spread function (PSF).

Figure 5:
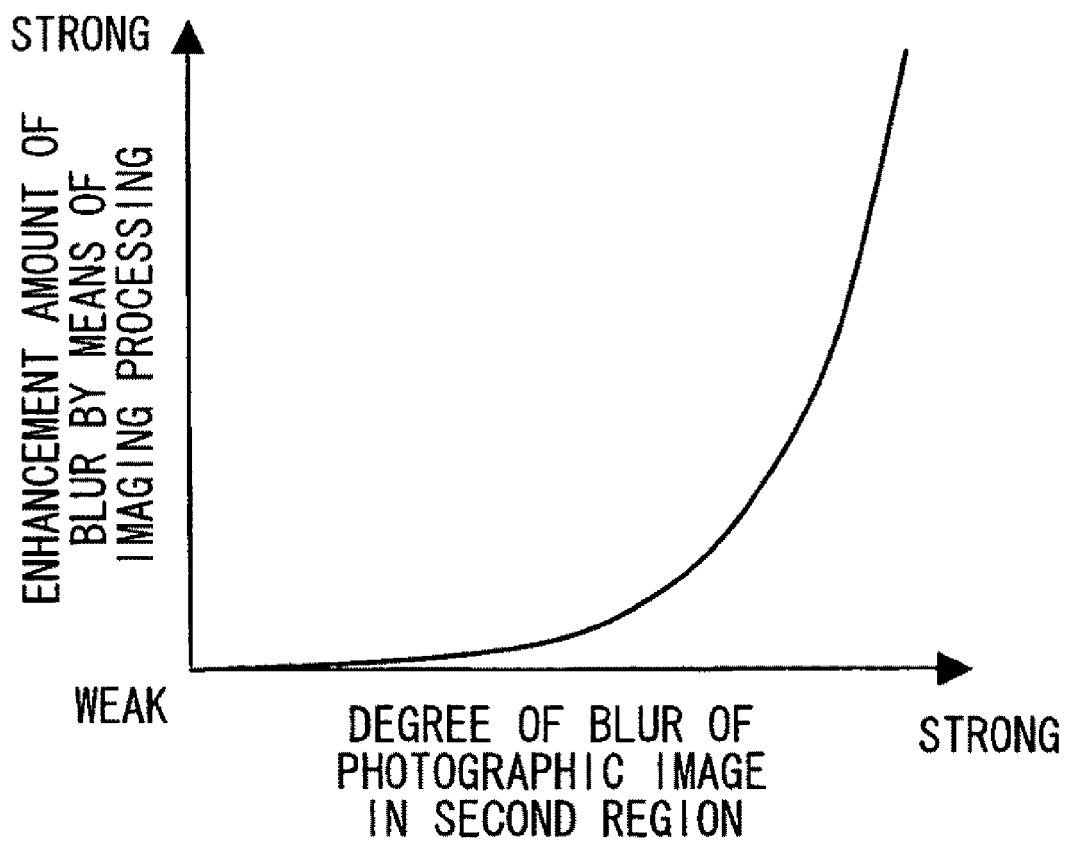
FIG. 5 is a correlation diagram of the degree of blur of an image of a second region and the enhancement amount of the blur by way of image processing.

Here, as illustrated in FIG. 5, the image processing section 16 enhances the blur of the image of the second region depending on the magnitude of the degree of blur (S106) in the second region. In other words, when the degree of blur of the second region detected at S106 is small, the image processing section 16 selects a filter having small point spread function, such as filters in FIG. 6(a) and FIG. 7(a), and causes the enhancement amount of the blur in the second region by way of image processing to be small.

Figure 6:
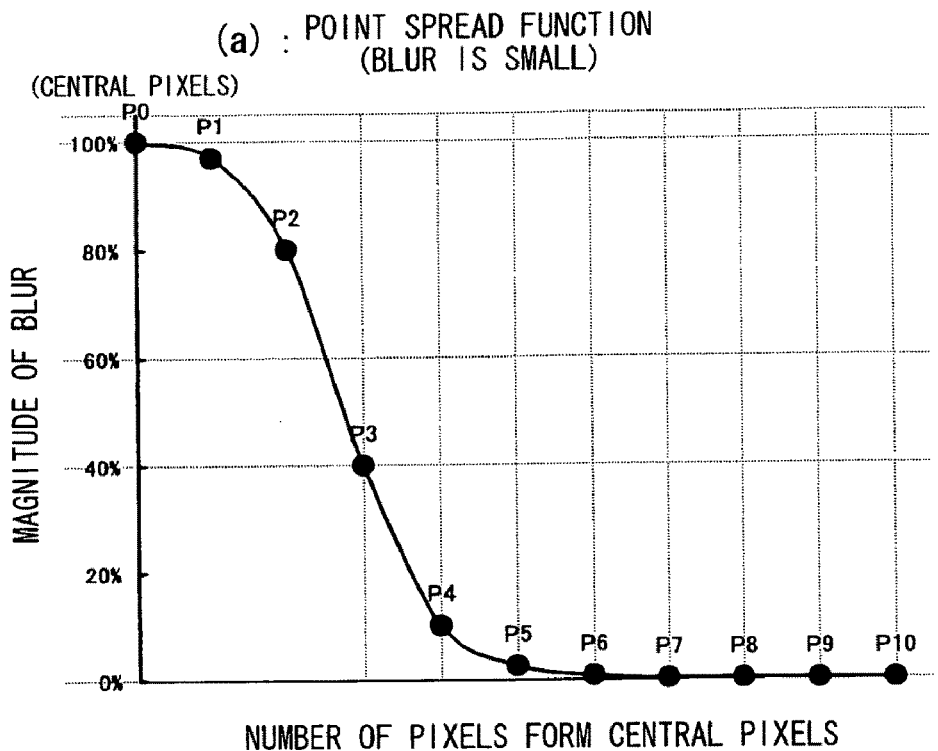
FIGS. 6(a) and 6(b) are views illustrating the filter characteristics of two kinds of point spread functions.
Figure 6:
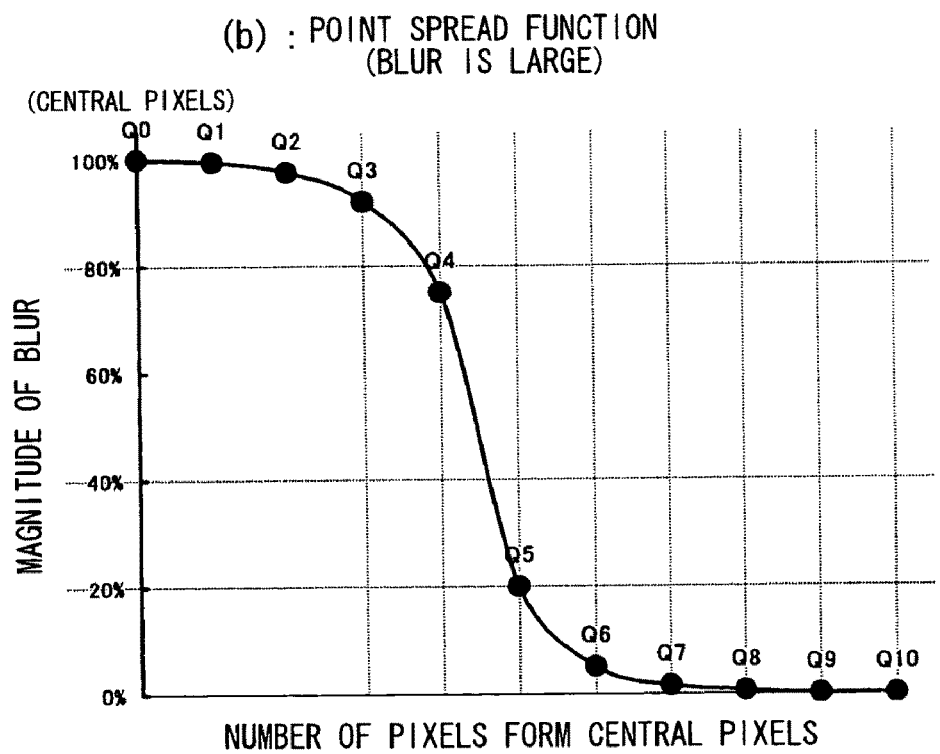
Figure 7:
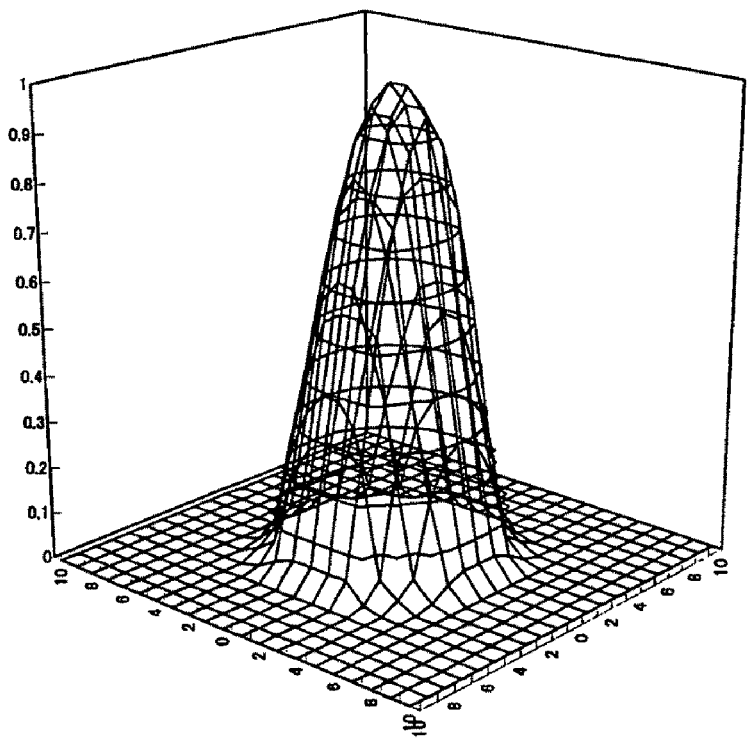
FIGS. 7(a) and 7(b) are views three-dimensionally illustrating the filter characteristics of the two kinds of point spread functions.
Figure 7:
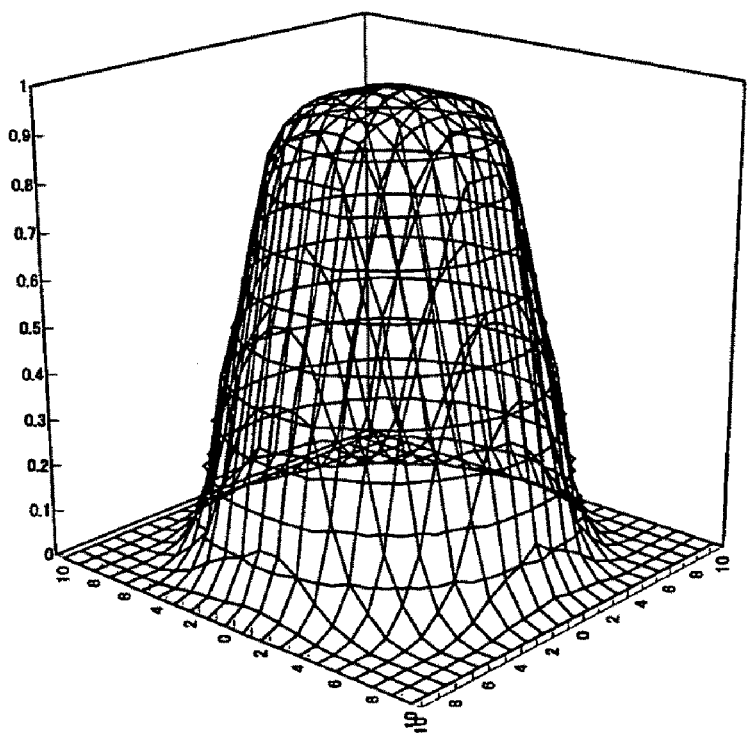
Figure 8:
FIG. 8 is a view illustrating the state before image processing in the "blur enhancement mode" of the first embodiment.
Figure 9:
FIG. 9 is a view illustrating the state after image processing in the "blur enhancement mode" of the first embodiment.

On the other hand, when the degree of blur of the second region detected at S106 is large, the image processing section 16 selects a filter having large point spread function, such as filters in FIG. 6(b) and FIG. 7(b), and causes the enhancement amount of the blur in the second region by way of image processing to be large. In addition, in FIGS. 6(a) and 6(b), for the purpose of simplification, only the spreading characteristics of one direction to a point to be noted is illustrated. Moreover, the filters of the point spread function illustrated in FIGS. 6(a) and 6(b) and FIGS. 7(a) and 7(b) are examples, and practically, a filter for use of application may be selected among filters having three or more kinds of point spread functions. Further, FIG. 9 illustrates an example where imaging processing is performed on the image (in FIG. 8) at S107.

Step S108: The CPU 22 records the photographic image data after the above-mentioned blur enhancement process on the recording medium 24, and completes a series of processing steps.

Step S109: In this case, the CPU 22 generates the attached information which indicates the first region and second region in the photographic image data.

Step S110: The CPU 22 associates the photographic image data (S101) with the attached information (S109), and generates an image file. Then, the CPU 22 records the image file on the recording medium 24, and completes a series of processing steps. In addition, like the below-mentioned fourth embodiment, the image file is used when a user performs the blur enhancement process in an ex post facto manner by way of a personal computer etc.

Hereinafter, the effect of the first embodiment will be described.

In the first embodiment, the blur enhancement processing is performed on the second region corresponding to the foreground or the background depending on the detected degree of blur of the image (S107). Moreover, in the first embodiment, a contrast enhancement processing is performed on the first region where the main subject is located (S104). Therefore, in the first embodiment, an image of the portrait photography tone with excellent contrast can be obtained easily in the electronic camera. Moreover, since the degree of blur of the second region after image processing is proportional to the degree of blur of the original photographic image, an image with natural degree of blur close to actual perspective can be obtained.

Further, in the first embodiment, since the blur enhancement process is performed depending on the detected degree of blur of the image, like the case of the technology in Patent Document 1, a special distance measuring units etc. is not required. Moreover, in the first embodiment, since the degree of blur of the image is detected by the compressing/expanding processing section, a special circuit and software etc. for frequency analysis are not required. Therefore, the first embodiment has a remarkable effect in that, by use of a substantially usual configuration of the electronic camera, an image of portrait photography tone as mentioned above can be obtained.

Variation of First Embodiment

In the first embodiment, information of the degree of blur of an image is obtained by performing the DCT transform over the entire second region (S106). However, the CPU 22 may perform frequency analysis with respect to the outline portion of the image of the second region, and, based on the high frequency component of the outline portion in the second region, determine the degree of blur of the image.

As an example, based on the result of the edge extracting process (S102) by the image processing section 16, the CPU 22 specifies the outline portion of the second region. Then, the compressing/expanding processing section 17 performs DCT transform only on each of the pixel blocks containing the outline portion of the second region of the photographic image data. Then, the CPU 22 obtains the DCT coefficient of the outline portion of the second region as information of the degree of blur of the image. Of course, the CPU 22 may calculate the high frequency components contained in the image of the outline portion of the second region by way of other known frequency analyses (such as discrete Fourier transform and wavelet transform), and determine the degree of blur of the image.

Description of Second Embodiment

Figure 10:
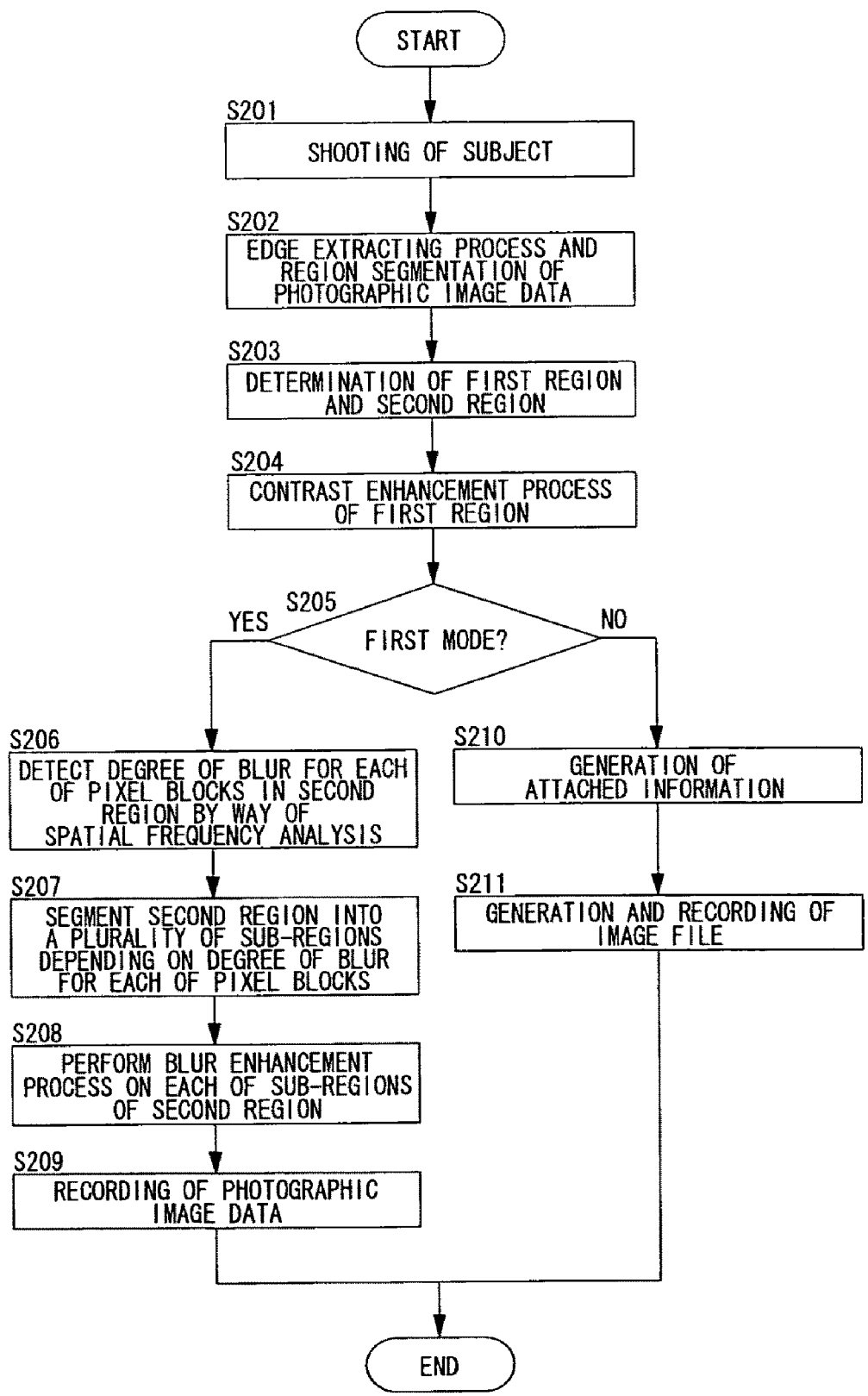
FIG. 10 is a flow chart illustrating the operation in the "blur enhancement mode" of an electronic camera of a second embodiment.

FIG. 10 is a flow chart illustrating operation in the "blur enhancement mode" of an electronic camera of a second embodiment. Here, in the second embodiment and a third embodiment, since the block diagrams of an electronic camera are common to that of FIG. 1, illustrations of them will be omitted in figures, and common configurations will be denoted by the same reference numerals, and their description will be omitted.

Figure 11:
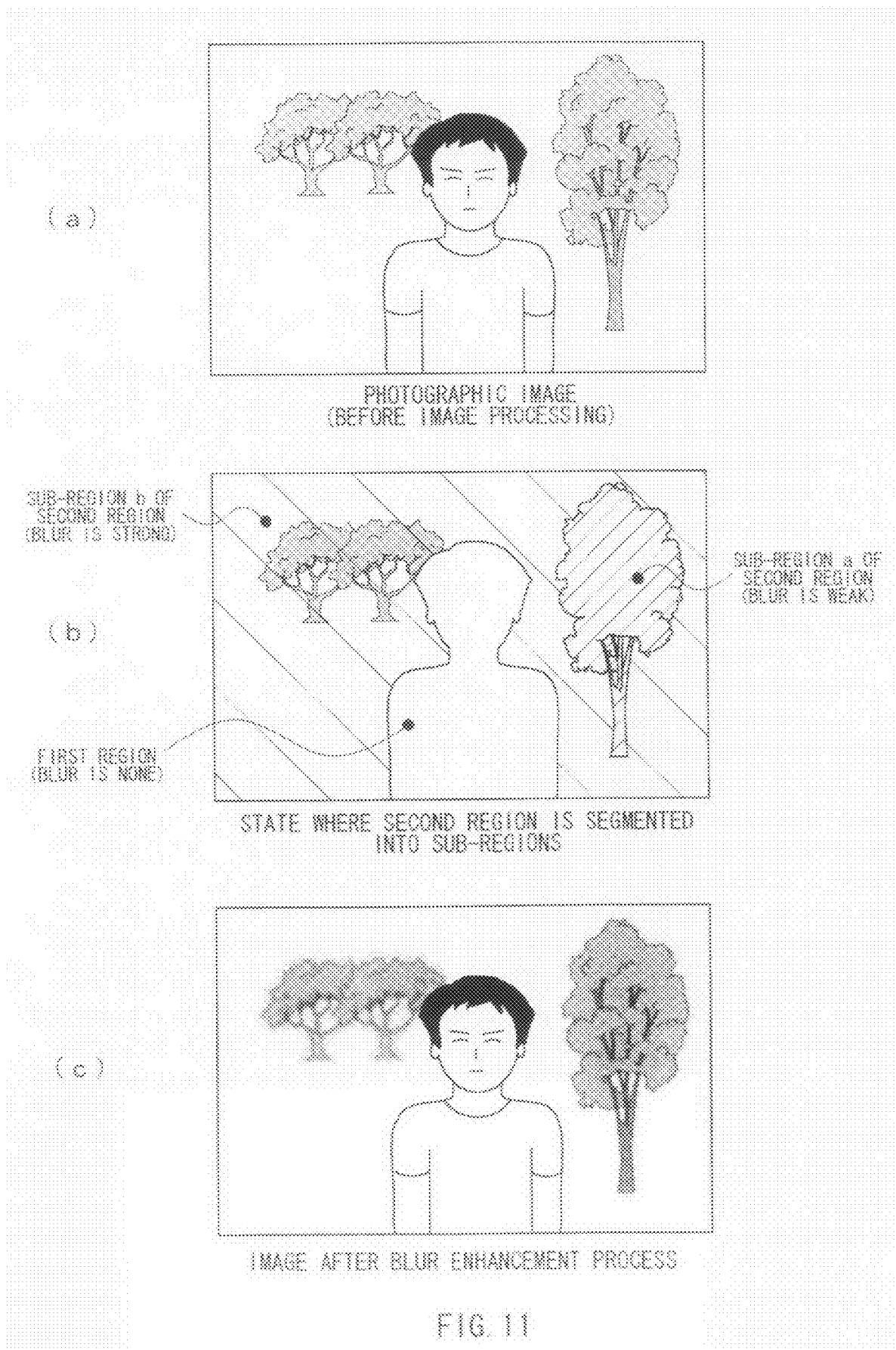
FIGS. 11(a) to 11(c) are conceptual views for illustrating the image processing in the second embodiment.

The second embodiment is a variation of the first embodiment, and differs from the first embodiment in that, as illustrated in FIGS. 11(*a*) to 11(*c*), the second region is further segmented into a plurality of sub-regions depending on the degree of blur, and the blur enhancement process is performed on the image of the second region for each of the sub-regions, respectively. In addition, since S201 to S205 in FIG. 10 correspond to S101 to S105 in FIG. 2, respectively, and S209 to S211 in FIG. 10 correspond to S108 to S110 in FIG. 2, respectively, duplicated descriptions thereof will be omitted.

Step S206: The CPU 22 detects the degree of blur of the second region (S203) of the photographic image data by way of the spatial frequency analysis in an image using the compressing/expanding processing section 17. Since the specific detection procedure for the degree of blur is common to that at S106 in FIG. 2, the description thereof will be omitted. At S206, the CPU 22 obtains information of the degree of blur of the image, such as coefficients for each of the frequency components at the time of the DCT transform, for each of the pixel blocks in the second region, respectively.

Step S207: Based on the degree of blur for each of the pixel blocks at S206, the CPU 22 further segments the second region into a plurality of sub-regions. For examples, by grouping each of the pixel blocks for each of threshold values set for the values of the degree of blur in a phased manner, the CPU 22 segments the second region (refer to FIG. 11(*b*)). In addition, the CPU 22 may also simultaneously use information of the outline extracted at S202 so as to segment the second region into a plurality of sub-regions.

Step S208: In accordance with the instruction of the CPU 22, the image processing section 16 performs blur enhancement process on each of the sub-regions (S207) of the second region depending on the magnitude of the degree of blur thereof (refer to FIG. 11(*c*)). Regarding the blur enhancement process, since it is common to S107 in FIG. 2, the description thereof will be omitted.

An effect substantially similar to that of the first embodiment can also be obtained by the configuration of the second embodiment. In particular, since, in the second embodiment, different blur enhancement process is performed on each of the sub-regions, respectively, an image with natural degree of blur closer to actual perspective than that of the first embodiment, can be obtained.

Description of Third Embodiment

Figure 12:
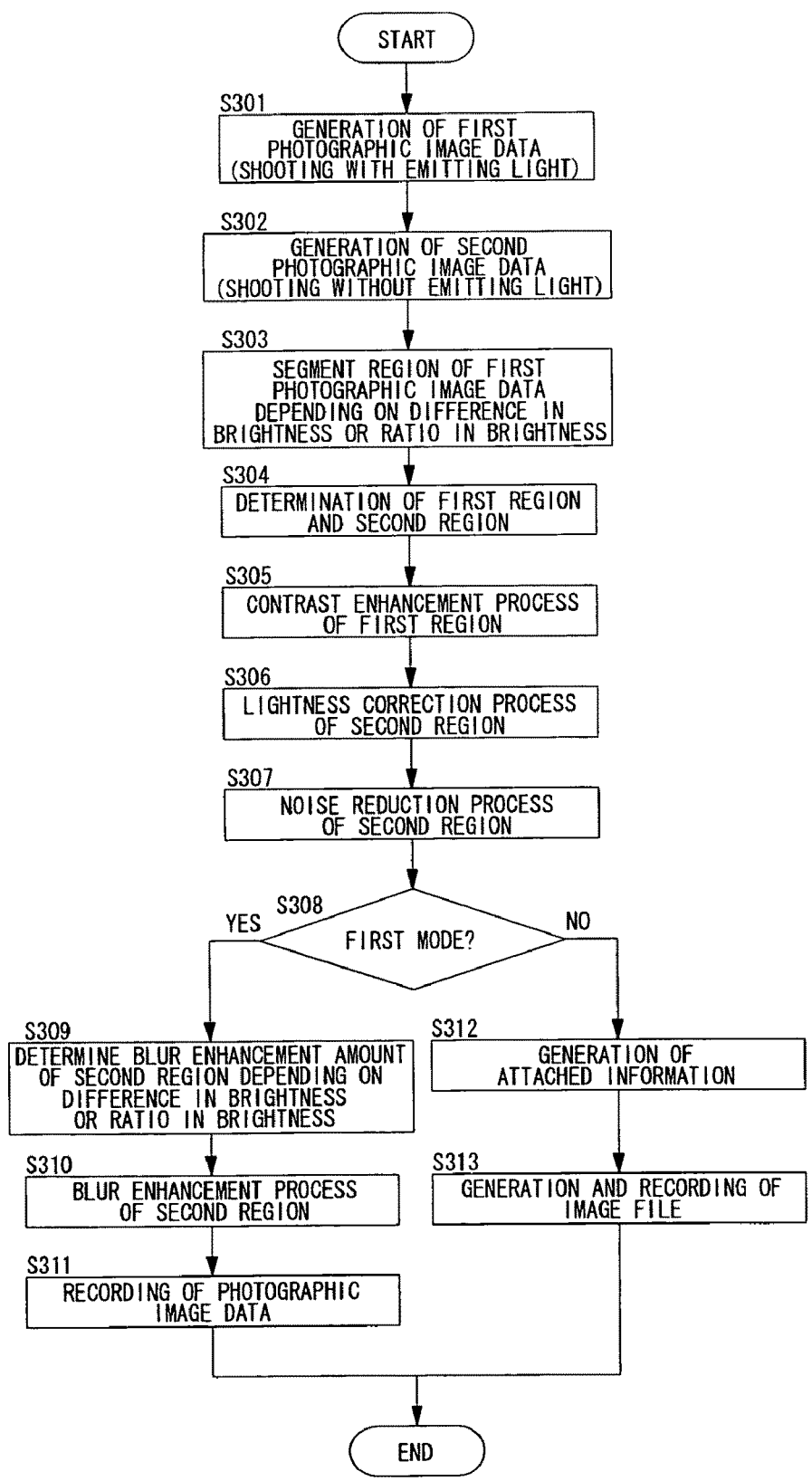
FIG. 12 is a flow chart illustrating the operation in the "blur enhancement mode" of an electronic camera of a third embodiment.

FIG. 12 is a flow chart illustrating the operation in the "blur enhancement mode" of an electronic camera of a third embodiment.

The third embodiment is a variation of the first example, and differs from the first embodiment in that, based on first photographic image data shot with emitting light at an emitting section 21 and second photographic image data shot without emitting light, the image of first photographic image data is segmented into a first region and a second region. In addition, since S311 to S313 in FIG. 12 correspond to S108 to S110 in FIG. 2, respectively, duplicated descriptions thereof will be omitted.

Step S301: A user instructs an electronic camera to image a subject by way of full-pressing operation of a release button. The CPU 22 of the electronic camera images a subject image by causing the emitting section 21 to emit light and driving the image sensor 13 at the time of releasing. Then, based on the image signal at the time of releasing, the image processing section 16 generates the first photographic image data. The first photographic image data is temporarily recorded on the buffer memory 15. In addition, the CPU 22 records temporarily photographic information, (such as the position of the focusing area, set information of the scene assist function, and face recognition information), on the buffer memory 15 etc.

Step S302: After shooting at S301, the CPU 22 images a subject image substantially the same as that at S301 without causing the emitting section 21 to emit light, by driving the image sensor 13. Then, based on the image signal, the image processing section 16 generates second photographic image data. The second photographic image data is also temporarily recorded on the buffer memory 15.

Figure 13:
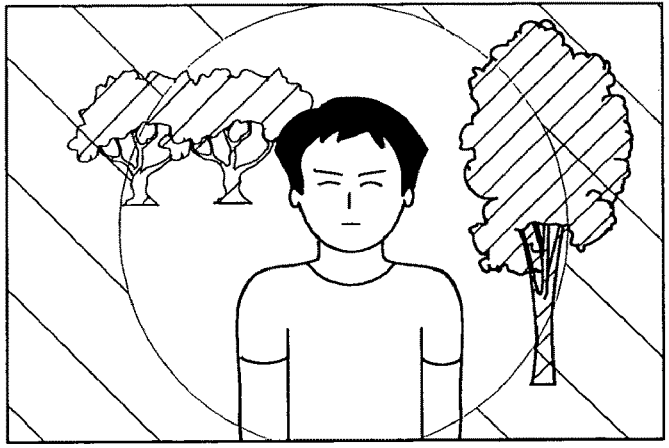
FIGS. 13(a) to 13(c) are conceptual views for illustrating the region segmentation in the third embodiment.
Figure 13:
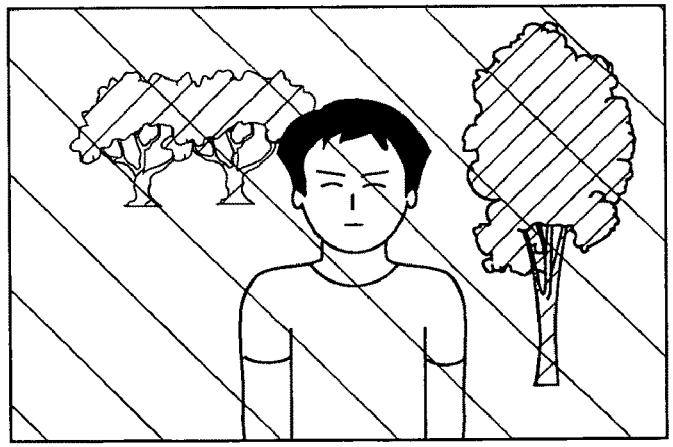
Figure 13:
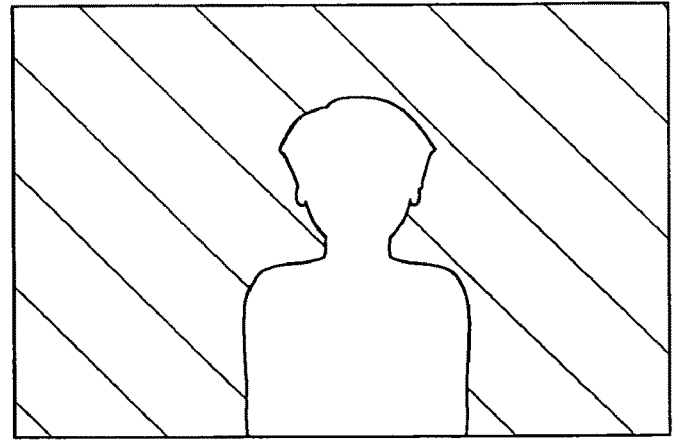

Step S303: Based on the first photographic image data (S301) and the second photographic image data (S302), the CPU 22 segments the image of the first photographic image data into a plurality of regions. Specifically, the CPU 22 segments the image by way of the following method (1) or (2) (refer to FIGS. 13(*a*) to 13(*c*)).

(1) The CPU 22 calculates difference value in brightness between the first photographic image data and the second photographic image data for each of the pixels. Then, based on the difference value in brightness, the CPU 22 segments the image of the first photographic image data into a plurality of regions.

In general, illuminance at the time of shooting with emitting light becomes smaller in proportion to the square of the distance from a light source. In other words, while the main subject is illuminated brightly at the time of shooting with emitting light, the brightness of the background located far away than the main subject becomes lower. Therefore, since the difference value in brightness between cases of shooting with emitting light and shooting without emitting light changes depending on the distance from the camera, if such difference value is used, region segmentation of a photographic image can be performed.

(2) The CPU 22 calculates the ratio in brightness between the first photographic image data and the second photographic image data. Then, based on the ratio in brightness, the CPU 22 segments the image of the first photographic image data into a plurality of region.

If region segmentation is performed using the above difference value of (1), in a subject where a high reflectance portion and a low reflectance portion neighbor each other, accuracy of the region segmentation may decrease. For example, if a case where the face of a black hair person is imaged, is considered, while the portion of black hair will have a small difference value in brightness due to its low reflectance, the portion of face will have a high difference value in brightness due to relatively high reflectance. Therefore, in the above-mentioned case, in some cases, the person may be segmented into regions of black hair portions and regions of face portions.

Here, the brightness of the first photographic image data will be a value that is product of the sum of illuminating light by the emitting section 21 and ambient light, and the reflectance of the subject (i.e. (illuminating light component+ambient light component)×reflectance). Moreover, the brightness of the second photographic image data will be a value that is product of the ambient light and the reflectance of the subject (i.e. ambient light component×reflectance). Therefore, when region segmentation is performed based on the ratio in brightness, since the reflectance of the subject is balanced out, even for the subject as mentioned above, where a high reflectance portion and a low reflectance portion neighbor each other, it is possible to perform region segmentation in a high accuracy.

Step S304: The CPU 22 determines a region (first region) where the main subject is located and the other region (second region) among regions segmented at S303. Similar to S103 in FIG. 2, based on the positions of a focusing area, a construct assisting frame, and a face detected by way of face recognition, and the like, the CPU 22 determines the first region.

Step S305: In accordance with the instruction of the CPU 22, the image processing section 16 performs known contrast enhancement processing, (such as tone correction), on the portion of the first region (S304). In addition, by the setting change of a user, in some cases, the CPU 22 may omit the procedures from S305 to S307.

Step S306: In accordance with the instruction of the CPU 22, the image processing section 16 increases the gain of the portion of the second region (S304) of the photographic image data, and performs a correction process that increases the lightness of the second region. Thereby, an image of which background is extremely dark can be corrected to have desirable brightness.

Step S307: In accordance with the instruction of the CPU 22, the image processing section 16 performs noise reduction processing on the portion of the second region (S304) of the photographic image data by way of, for example, a median filter. Since this reduces noises which have become conspicuous due to the increase in the gain of the background portion (S306), image quality of the photographic image improves. In addition, since the noises of the image are also reduced by way of the below-described blur enhancement process, the procedure at S307 may be omitted.

Step S308: The CPU 22 determines whether or not the first mode is selected, in the "blur enhancement mode". When the first mode is selected (YES side), the CPU 22 proceeds to S309. On the other hand, when the second mode is selected (NO side), the process proceeds to S312.

Step S309: Based on the difference value in brightness or the ratio in brightness (S303), the CPU 22 determines the enhancement amount of the blur in the second region. Specifically, as the difference value in brightness or the ratio in brightness between the first region and the second region becomes larger, the CPU 22 sets the enhancement amount of the blur in the second region by way of image processing to be larger.

Step S310: In accordance with the instruction of the CPU 22, the image processing section 16 performs blur enhancement process on the portion of the second region of the first photographic image data. Since the blur enhancement process is common to S107 in FIG. 2, the description thereof will be omitted.

Hereinafter, the effect of the third embodiment will be described.

In the third embodiment, based on information of two image data by way of shooting with emitting light and shooting without emitting light, the image is segmented into a first region and a second region (S303, S304). Therefore, in the third embodiment, even when the field is dark, region segmentation of an image can be performed in a high accuracy.

Moreover, in the third embodiment, depending on the difference value in brightness or the ratio in brightness (S303) between both images which are obtained by shooting with emitting light and by shooting without emitting light, respectively, the second region corresponding to the foreground or the background is subjected to blur enhancement processing (S310). Therefore, an image of the portrait photography tone with excellent contrast can be obtained easily in the electronic camera. Moreover, since the degree of blur of the second region after image processing is proportional to the difference value in brightness or the ratio in brightness, an image with natural degree of blur close to actual perspective can be obtained.

Further, in the third embodiment, like the case of the technology in Patent Document 1, a special distance measuring units etc. is also not required. Therefore, the third embodiment also has a remarkable effect in that, by use of a substantially usual configuration of the electronic camera, an image of portrait photography tone as mentioned above can be obtained.

Description of Fourth Embodiment

Figure 14:
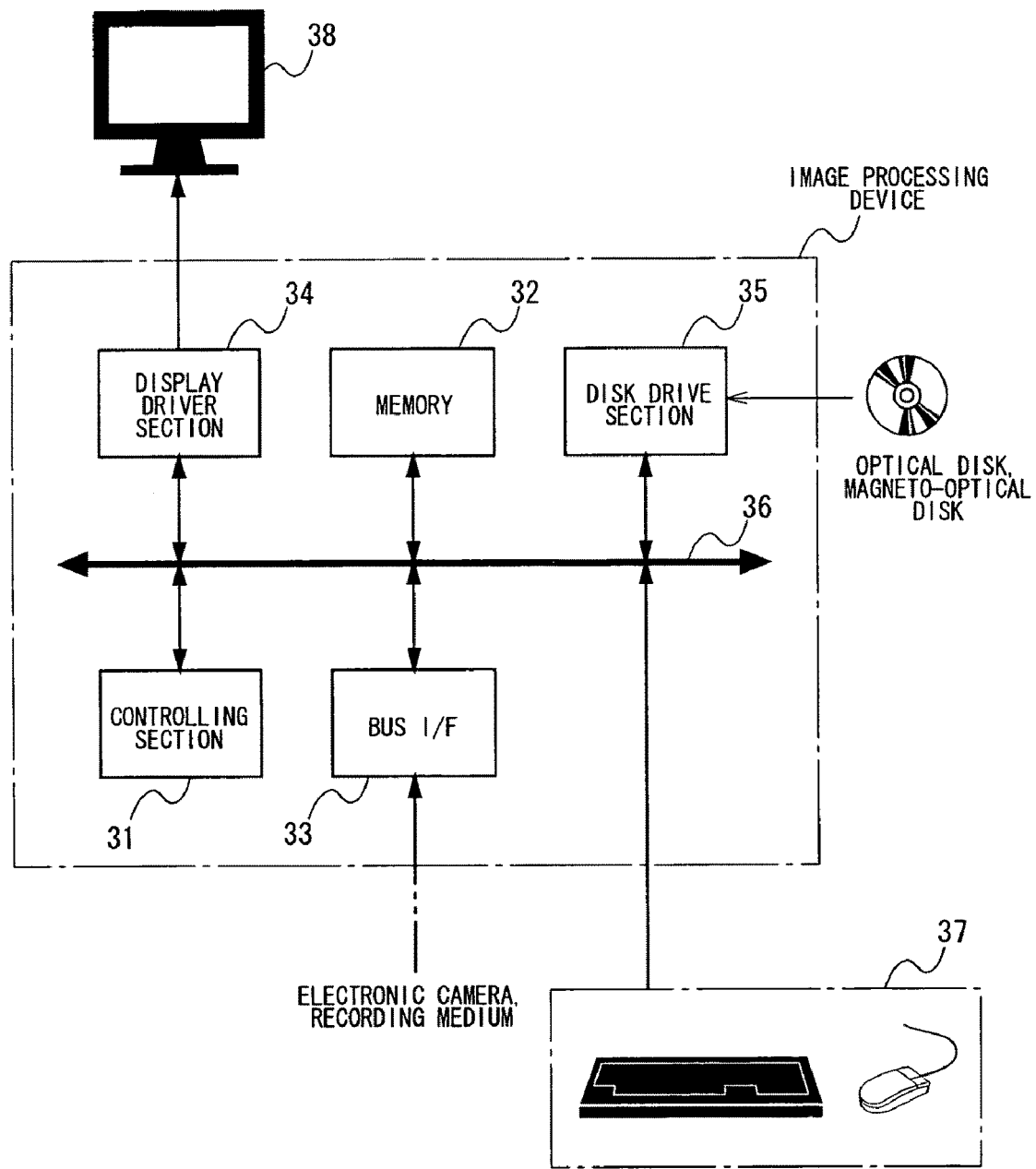
FIG. 14 is a block diagram of an image processing device of a fourth embodiment.

FIG. 14 is a block diagram of the image processing device of a fourth embodiment. The fourth embodiment is an example where an image processing device is configured by causing a personal computer etc. to execute an image-processing program.

Here, the image processing program of the fourth embodiment processes "photographic image data" preliminarily generated by an electronic camera, or an "image file" generated in the first embodiment to the third embodiment, as a process target.

An image processing device has a controlling section 31, a memory 32, a bus I/F 33, a display driver section 34, a disk drive section 35, and a system bus 36 connecting each of the sections. Moreover, input units 37, such as a keyboard and a pointing device, and a monitor 38 are connected to the image processing device.

The controlling section 31 operates and controls each of the sections of the image processing device, and executes the below-mentioned image processing program. The memory 32 memorizes a program and data, and memorizes data transmission to the controlling section 31 and the processed result returned from the controlling section 31. The bus I/F 33 controls data transmission and reception with peripheral equipments (for example, an electronic camera, a recording medium, and the like) connected to the image processing device in conformity with serial communication standards, such as, for example, USB (Universal Serial Bus) and IEEE1394. The display driver section 34 outputs an image to the monitor 38. The disk drive section 35 executes reading-out/writing of photographic image data to recording media, such as an optical disk and a magneto-optical disk.

Figure 15:
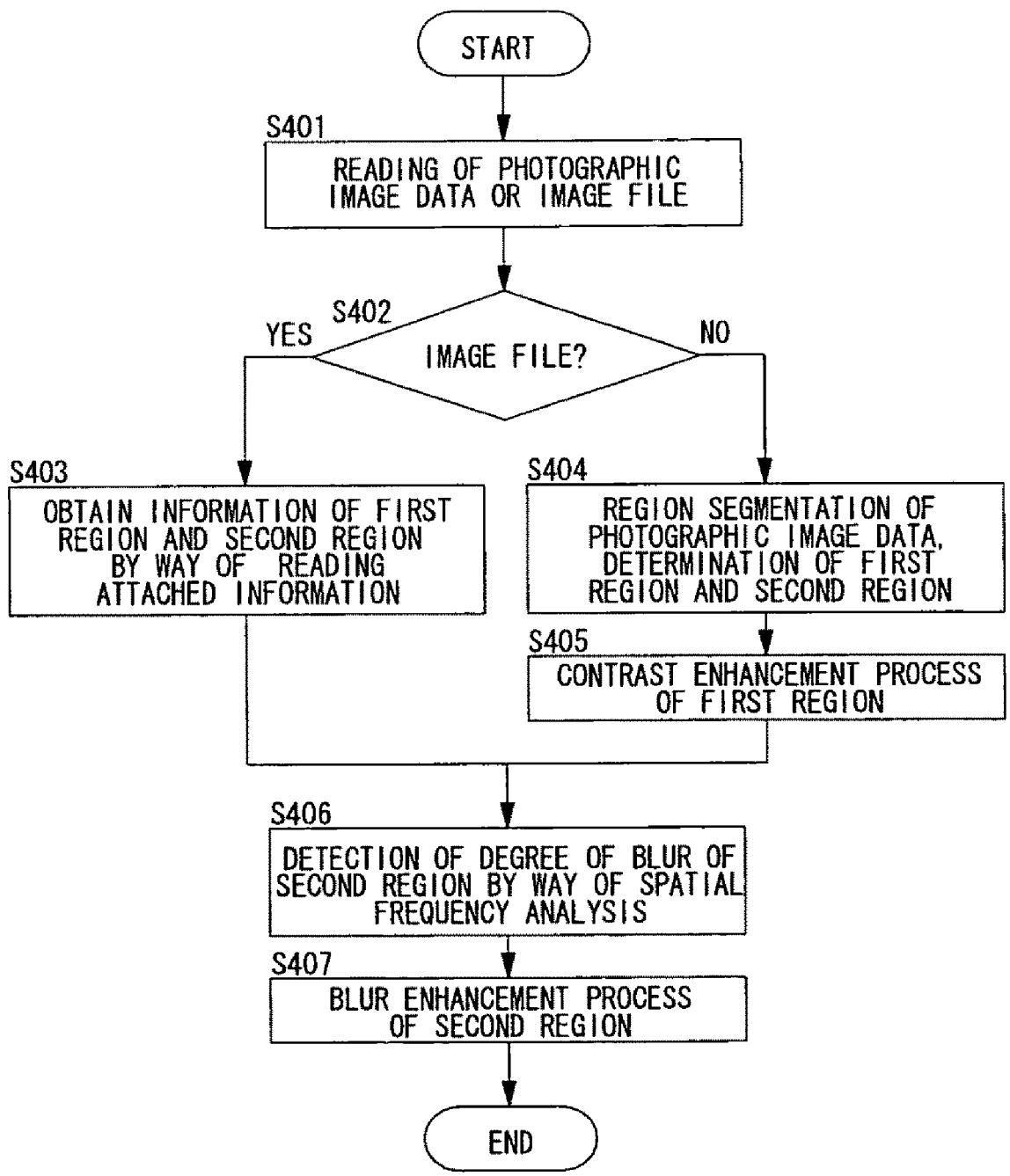
FIG. 15 is a flow chart illustrating the operation of an image processing program of the fourth embodiment.

Hereinafter, with reference to the flow chart in FIG. 15, the operation of an image processing program of the fourth embodiment will be described.

Step S401: The controlling section 31 reads photographic image data or an image file from the bus I/F 33 or the disk drive section 35.

Step S402: The controlling section 31 determines whether the process target is an "image file" or not. When the process target is the image file (YES side), the process proceeds to S403. On the contrary, when the process target is the photographic image data (NO side), the process proceeds to S404.

Step S403: The controlling section 31 reads out the attached information of the image file, and obtains the information of the first region and the second region in the photographic image data. After that, the process proceeds to S406.

Step S404: In this case, first, the controlling section 31 performs edge extracting processing on the photographic image data, and, based on the extracted edge, segments the image of the photographic image data into a plurality of regions. Next, the controlling section 31 determines the region (first region) where the main subject is located, and the other region (second region) among the above-mentioned segmented region. Here, since the determination of the first region and the second region is the same as that of the first embodiment, the description thereof will be omitted.

Step S405: The controlling section 31 performs known contrast enhancement processing (tone correction processing etc.) on the portion of the first region of the photographic image data.

Step S406: By way of spatial frequency analysis in the screen, the controlling section 31 detects the degree of blur of the second region of the photographic image data. In the spatial frequency analysis, the DCT transform used for JPEG compression like the above-mentioned embodiment may be utilized, and the other known frequency analysis units, such as fast Fourier transform may be used.

Step S407: The controlling section 31 performs blur enhancement processing on the portion of the second region of the photographic image data by way of the filter operation of the point spread function. The controlling section 31 sets the enhancement amount of the blur to be larger in proportion to the magnitude of the degree of blur of the second region (S406). As above, a series of operations of the image processing program will be completed.

In the fourth embodiment, post-processing process by a computer can also generate a portrait photography tone image similar to those of the first embodiment to the third embodiment. Therefore, in accordance with the fourth embodiment, since it is not necessary to perform image processing which consumes time for every shooting on the site, user's convenience at the time of shooting will be improved further.

Description of Fifth Embodiment

Figure 16:
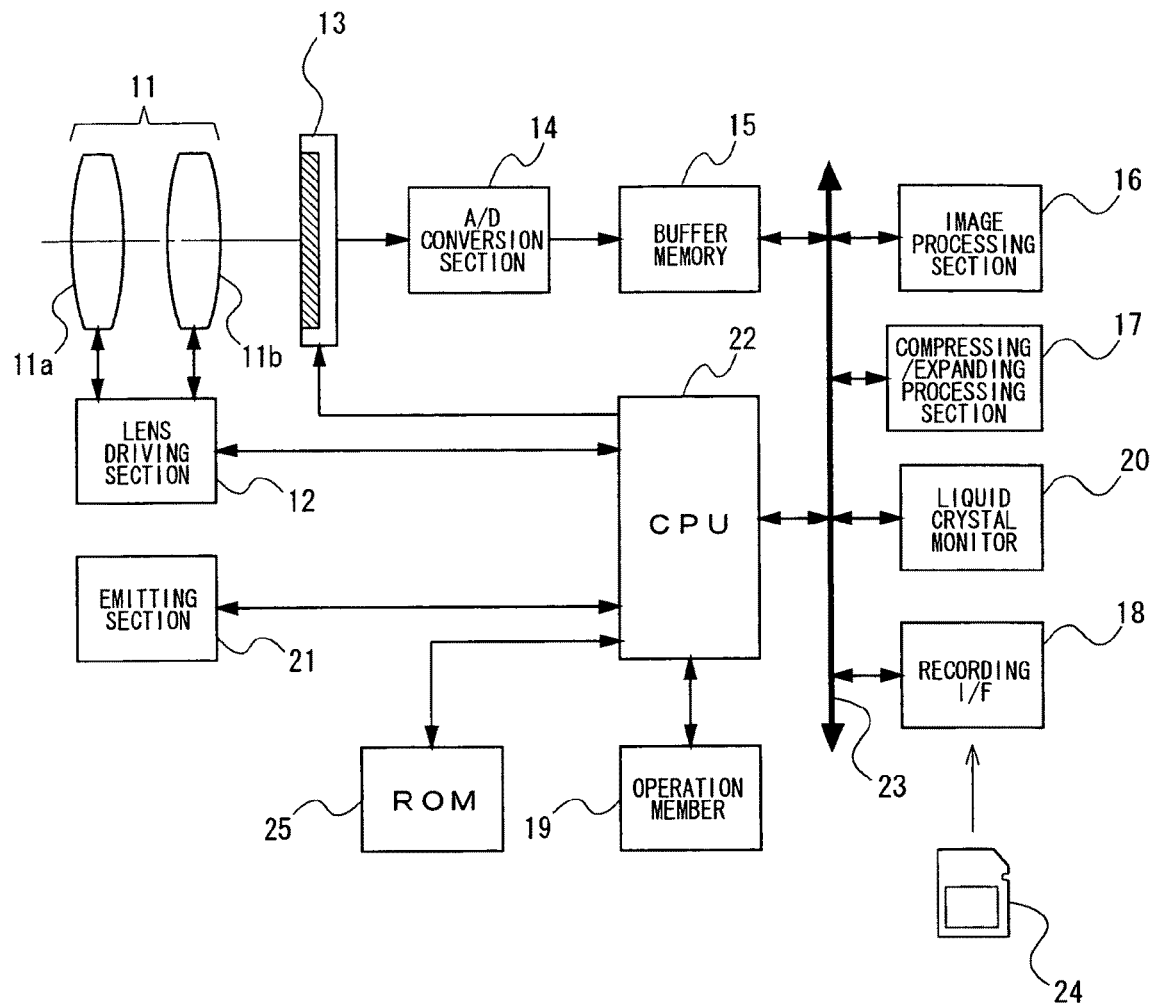
FIG. 16 is a block diagram illustrating the configuration of an electronic camera of a fifth embodiment.

FIG. 16 is a block diagram illustrating the configuration of an electronic camera of a fifth embodiment. Here, in FIG. 16, configurations common to those in FIG. 1 will be denoted with the same reference numerals, and their description will be omitted.

The electric camera of the fifth embodiment is a variation of the first embodiment, where ROM 25 is connected to CPU 22. On the ROM 25, a plurality of look-up tables (LUT) for determining the degree of blur of a subject in a blur enhancement mode is recorded. Here, in the LUT, a first LUT where correspondence relation between the focal-length of a shooting lens 11 and the correction value of magnitude of the degree of blur, and a second LUT where correspondence relation between the size of the subject and the correction value of magnitude of the degree of blur are contained.

Figure 17:
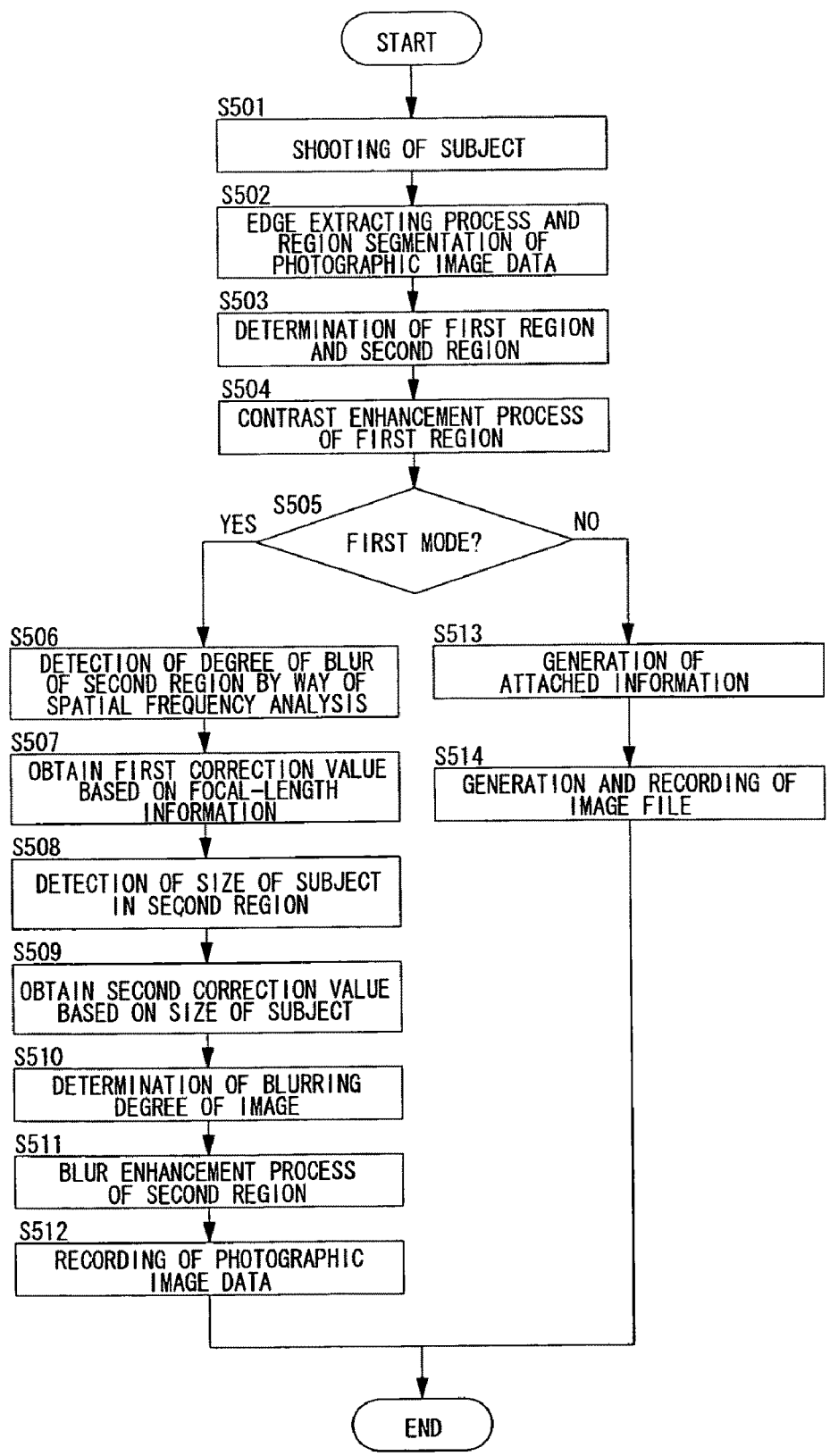
FIG. 17 is a flow chart illustrating the operation in a "blur enhancement mode" of the electronic camera of the fifth embodiment.

Hereinafter, the operation in the "blur enhancement mode" of the electronic camera of the fifth embodiment will be described, while referring to the flow chart in FIG. 17. Here, since S501 to S506 in FIG. 17 correspond to S101 to S106 in FIG. 2, respectively, and S512 to S514 in FIG. 17 correspond to S108 to S110 in FIG. 2, respectively, duplicated descriptions thereof will be omitted.

Step S507: Based on focal-length information (S501), the CPU 22 obtains the correction value (first correction value) of magnitude of the degree of blur from the first LUT of the ROM 25. The first correction value at S507 reflects the change of the degree of blur due to the focal-length of the shooting lens 11 to an image, and thus more natural blurred image can be obtained. Here, the first correction value at S507 is set so that as the value of the focal-length of the shooting lens 11 will be larger, the degree of blur of the image will be larger. It is because there is a tendency that, in general, in a case where the size of a subject in photographic imaging is equal, at the short focus side the blurring of the background will be smaller, and at the long focus side the blurring of the background will be larger.

Step S508: The CPU 22 detects the size of each of the subjects in the second region. For example, the CPU 22 segments the second region for each of the subjects based on the result of region segmentation at S502, and detects the size of the subject from the number of pixels of the segmented region. Moreover, when neighboring pixels represent equivalent brightness values or color tone, the CPU 22 may group these pixel groups by equating them as the same subject, and detect the size of the subject by the number of the grouped pixels. Further, when a person's face is present in the second region at the time of shooting using a face recognition function, the CPU 22 may detect the size of the subject from the information regarding the size of the face region in a face recognition process.

Step S509: Based on the size (S508) of each of the subjects in the second region, the CPU 22 obtains the correction value (second correction value) of magnitude of the degree of blur from the second LUT of the ROM 25. The second correction value at S509 reflects the change of the degree of blur due to the size of the subject to an image, and thus more natural blurred image can be obtained. Here, the second correction value at S509 is set so that as the size of the subject will be larger, the degree of blur of the image will be larger. It is because there is a tendency that, in general, in a case where the focal-length of the shooting lens 11 is equal, as the size of the subject of the background will be smaller, the blurring of the image will be smaller, and as the size of the subject of the background will be larger, the blurring of the image will be larger.

Step S510: The CPU 22 corrects the value of the degree of blur of an image of the second region obtained at S506 using a first correction value (S507) and a second correction value (S509) to determine the blurring degree of the image by way of image processing. Here, the value of the second correction value differs for each of subjects in the second region. Therefore, when a plurality of subjects is present in the second region, the CPU 22 can also obtain the value of the blurring degree of the image for each of the subjects.

In addition, at S510, the CPU 22 may calculate the blurring degree from each of the above parameters. Moreover, by preliminarily generating a table for obtaining the blurring degree from each of the parameters, the CPU 22 may obtain the blurring degree by referring to the table for each of images.

Step S511: In accordance with the instruction of the CPU 22, the image processing section 16 performs the blur enhancement process on the second region based on the value of the blurring degree obtained at S510. In addition, the blur enhancement process at S511 is performed in the same manner as that at S107.

According to the fifth embodiment, in addition to an effect substantially the same as that of the first embodiment, more natural blurred image where the change of the degree of blur due to the focal-length of the shooting lens 111 or the size of the subject is reflected, can be obtained.

Description of Sixth Embodiment

Figure 18:
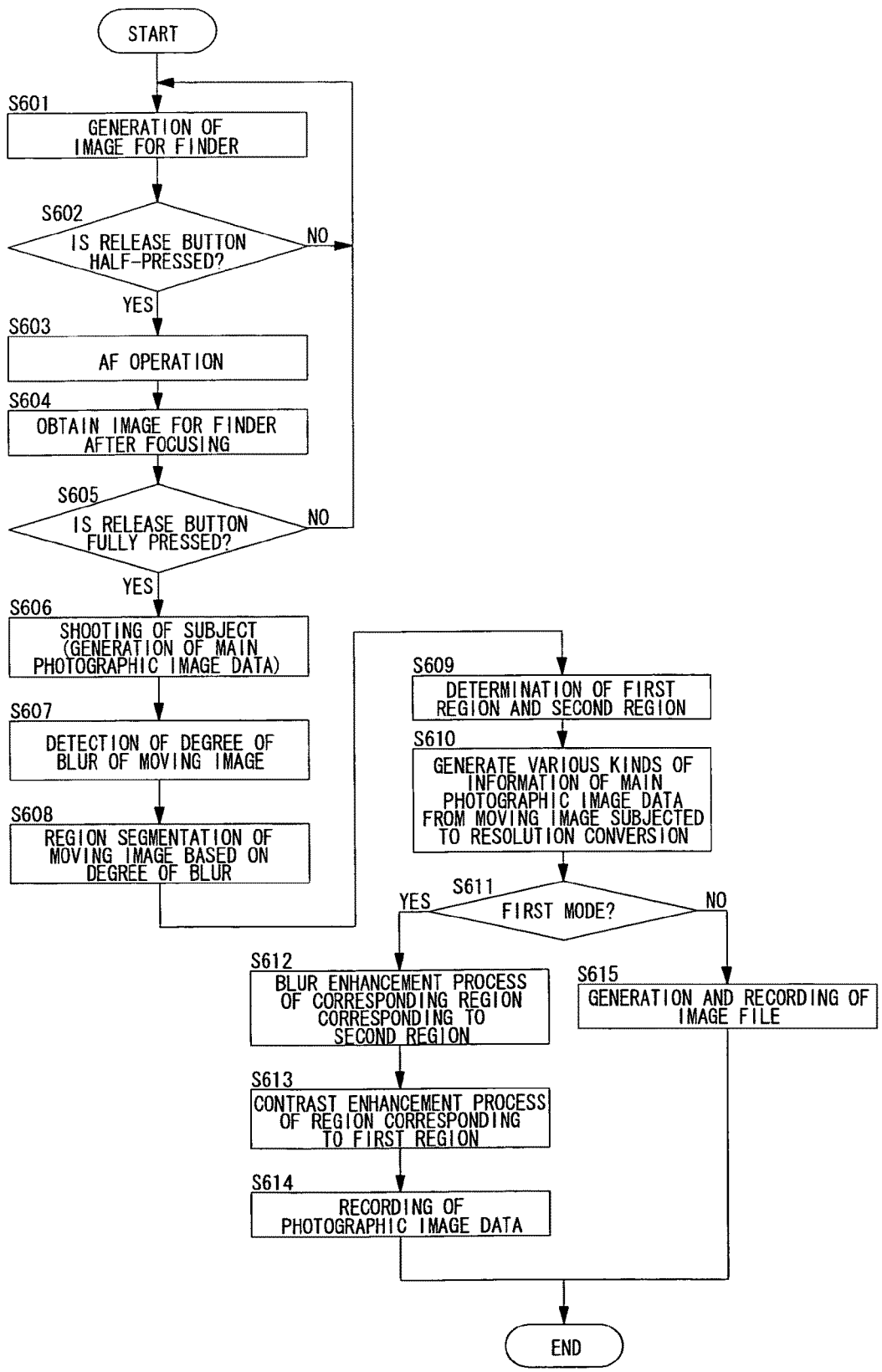
FIG. 18 is a flow chart illustrating the operation in a "blur enhancement mode" of an electronic camera of a sixth embodiment.

FIG. 18 is a flow chart illustrating the operation in a "blur enhancement mode" of an electronic camera of a sixth embodiment. Here, since the configuration of the electronic camera of the sixth embodiment is common to that of the electronic camera of the first embodiment illustrated in FIG. 1, duplicated description thereof will be omitted.

Step S601: At the time of waiting of shooting, the CPU 22 drives the image sensor 13 for every predetermined interval. The image sensor 13 reads out an image signal by way of thinning reading, and outputs a moving image signal. The image processing section 16 generates an image for the finder resized (subjected to pixel number conversion) in accordance with the liquid crystal monitor 20, based on the moving image signal. The CPU 22 sequentially displays the image for the finder on the liquid crystal monitor 20. Therefore, the user can perform framing of the subject by the image for the finder which is displayed on the liquid crystal monitor 20 as a motion image.

Step S602: The CPU 22 determines whether the release button is half-pressed by a user or not. When the release button is half-pressed (YES side), the process proceeds to S603. On the other hand, when the release button is not pressed (NO side), the process returns to S601, and the CPU 22 repeats the above operations.

Step S603: Based on the moving image signal, the CPU 22 executes an AF operation by way of contrast detection to move a focusing lens 11b to the focusing position.

Step S604: After focusing, the CPU 22 drives the image sensor 13 to obtain a moving image signal. Then, based on the moving image signal, in the similar manner as mentioned above, the image processing section 16 performs the pixel number conversion to generate the image for the finder. On the liquid crystal monitor 20, the image for the finder after focused is displayed. Moreover, the image data of the moving image after focused is temporarily recorded on the buffer memory 15.

Step S605: The CPU 22 determines whether the release button has been fully pressed (released) by the user or not. When the release button has been released (YES side), the process proceeds to S606. On the other hand, when the release button has not been released (NO side), the process returns to S601, and the CPU 22 repeats the above-mentioned operations. In addition, in this case, the CPU 22 eliminates the image data of the moving image of S604 from the buffer memory 15 by way of changing the state of the image data of the moving image on the buffer memory 15 into an overwritable state or the like.

Step S606: The CPU 22 drives the image sensor 13 to image a subject image (main shooting of a still image). Then, based on the image signal at the time of releasing, the image processing section 16 generates main photographic image data. The main photographic image data is temporarily recorded on the buffer memory 15. Moreover, the CPU 22 records temporarily photographic information, (such as the position of the focusing area, set information of the scene assist function, and face recognition information), on the buffer memory 15 etc. In addition, the resolution (number of pixels) of the image of the photographic image data by way of the main shooting of the still image is set so as to be at least higher than the resolution (number of pixels) of the moving image and the image for the finder.

Step S607: The CPU 22 detects the degree of blur of the moving image (S604) of one frame obtained just before the main shooting of a still image by way of frequency analysis. At S607, the spatial frequencies of the entire region of the moving image of the screen are analyzed by the analyzing section of the compressing/expanding processing section 17.

Specifically, first, the CPU 22 segments the moving image into the pixel blocks of about 8×8 pixels. Next, in accordance with the instruction of the CPU 22, the compressing/expanding processing section 17 performs DCT transform (discrete cosine transform) processing on each of the pixel blocks of the moving image to calculate a coefficient (DCT coefficient) indicating the amounts of each of the special frequency components. Then, based on the calculated DCT coefficient, the CPU 22 generates information of the degree of blur of the image for each of the pixel blocks. In addition, since the correlation between the DCT coefficient of the compressing/expanding processing section 17 and the degree of blur of the image is similar to that at step S106 of the first embodiment, duplicated description thereof will be omitted.

Step S608: In the moving image, the CPU 22 extracts pixel blocks having the value of the degree of blur at S607 (for example, the sum of coefficient values of components of spatial frequencies which are equal to or greater than a predetermined frequency, or the coefficient value of a predetermined spatial frequency) is smaller than a threshold value. Thereby, the moving image is segmented into two or more regions having different degrees of blur. At that time, by applying a plurality of different threshold values, the CPU 22 may further segment the moving image in a phased manner depending on the value of the degree of blur (refer to FIG. 19(b)).

Step S609: The CPU 22 determines a main subject region (first region) and the other region (second region) among the regions segmented at S608. Here, the CPU 22 determines a region having lowest degree of blur (a region where many high frequency components are contained and the contrast of the subject is high) as the first region. For example, the CPU 22 determines a region, such as a region where a highest special frequency component of which coefficient value is not zero is present, a region where the coefficient value of a predetermined spatial frequency is equal to or greater than a threshold value, or a region where the sum of coefficient values of components of spatial frequencies which are equal to or greater than a predetermined frequency is equal to or greater than a threshold value, as the first region.

Moreover, similar to S103 in the first embodiment, the CPU 22 may determine the first region, based on the positions of a focusing area, a construct assisting frame, and a face detected by way of face recognition, and the like, as auxiliary decision criterion for determining the first region.

Step S610: The CPU 22 converts the resolution (the number of pixels) of a moving image imaged just before the main shooting of an still image into the resolution (the number of pixels) of the photographic image to obtain correspondence relation between the position of each of the pixel blocks of the moving image, and each of the pixels of the main photographic image. Then, the CPU 22 applies the value of the degree of blur (S607) of each of the pixel blocks in the moving image to the main photographic image data, based on the correspondence relation. Moreover, the CPU 22 applies the information on region segmentation of the moving image (S608), and the position information on the first region and the second region (S609) to the main photographic image data, based on the correspondence relation.

In addition, the processing from S607 to S610 can also be simultaneously performed in parallel with generation processing of the photographic image data at S606.

Step S611: The CPU 22 determines whether the first mode is selected or not, in the "blur enhancement mode". When the first mode is selected (YES side), the process proceeds to S612. On the other hand, when the second mode is selected (NO side), the process proceeds to S615.

Step S612: In accordance with the instruction of the CPU 22, the image processing section 16 subjects the main photographic image data to blur enhancement processing. In the blur enhancement process, the image processing section 16 performs blur enhancement process on a region (corresponding region) corresponding to the second region (S609) of the main photographic image. The blur enhancement process is executed by way of a filter operation (convolution operation) of a point spread function. In addition, since the blur enhancement process at S612 is common to that of S107 in the first embodiment, duplicated description thereof will be omitted.

Figure 19:
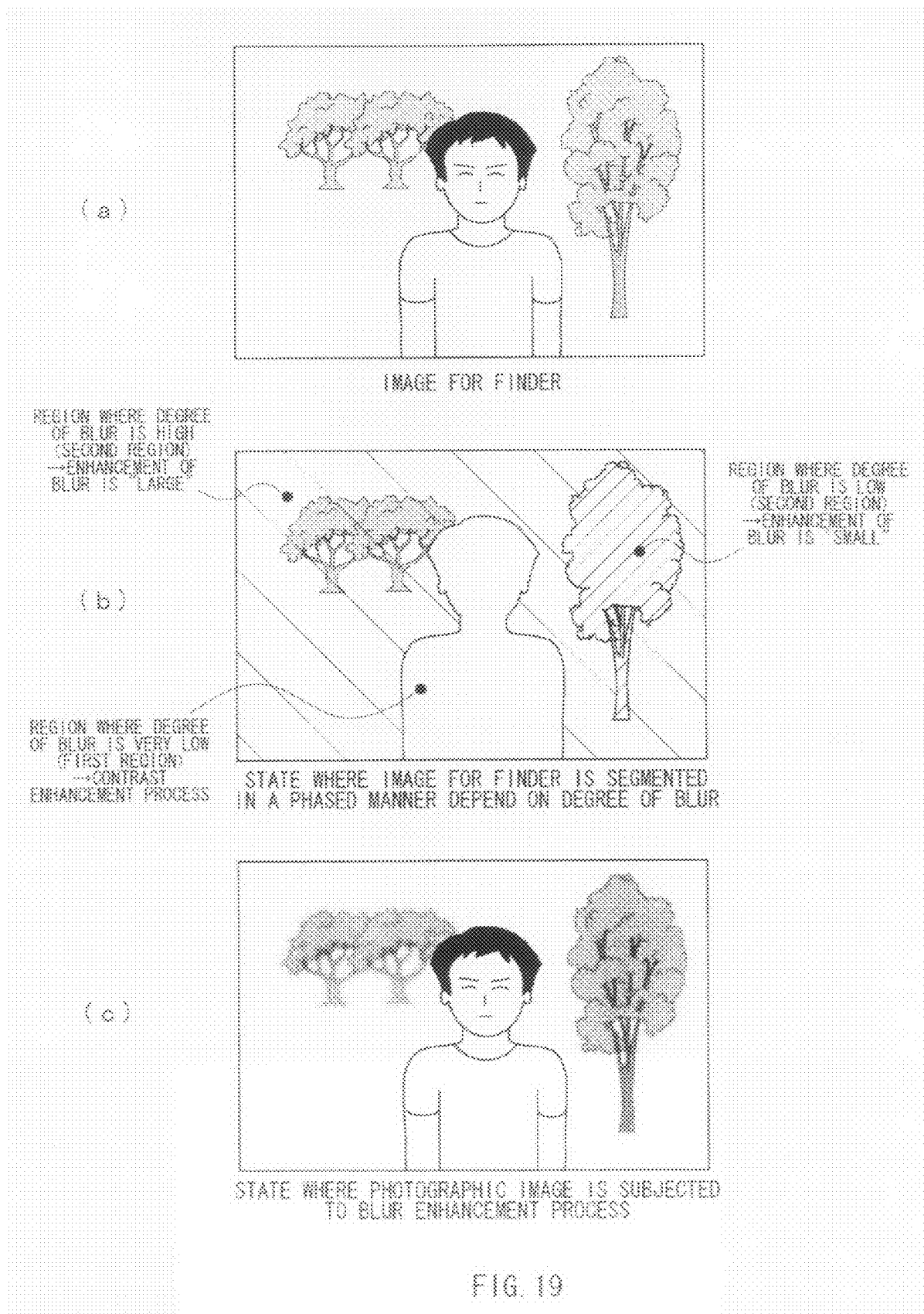
FIGS. 19(a) to 19(c) are conceptual views illustrating image processing when different filters are applied depending on the degree of blur of an image.

Here, at S612, the CPU 22 may calculate the average value of the degree of blur of the entire second region, and the image processing section 16 may perform convolution operation processing on the corresponding region corresponding to the entire second region by using a filter in accordance with the average value. Alternatively, when an image is segmented in a phased manner, by applying a plurality of threshold values at S608, the CPU 22 may calculate the average value of the degree of blur for each of regions having different threshold values in the second region, and the image processing section 16 may perform convolution operation processing on each of the segmented regions by using different filters, respectively. An example of the result after subjected to such processes is illustrated in FIG. 19(c), where the processed image is displayed as an image for a finder on a liquid crystal monitor 20. In case of the latter process, as compared to the case where the blur enhancement processing is performed on the entire second region using the same filter like the former process, an image with natural degree of blur closer to actual perspective can be obtained.

Step S613: In accordance with the instruction of the CPU 22, the image processing section 16 performs known contrast enhancement processing (tone correction or amplification of high spatial frequency components etc.) on portions of the first region of the photographic image data. In addition, by the setting change of a user, in some cases, the CPU 22 may omit the contrast enhancement process at S613.

Step S614: The CPU 22 records the photographic image data after the blur enhancement processing on the recording medium 24, and completes a series of processing steps.

Step S615: In this case the CPU 22 associates the value (S610) of degree of blur of the photographic image data, with the position information (S610) on the region corresponding to the first region and corresponding region corresponding to the second region of the main photographic image data, and the main photographic image data (S606), and generates an image file. Then the CPU 22 records the image file on the recording medium 24, and completes a series of processing steps. The image file at S615 is used when a user performs the blur enhancement process illustrated in S612 in an ex post facto manner by way of a personal computer etc. In case of the second mode, since it is not necessary to perform blur enhancement process for every shooting on the site, image processing time per one frame can be shortened further.

Hereinafter, the effect of the sixth embodiment will be described.

(1) In the sixth embodiment, the blur enhancement processing is performed on the corresponding region of the second region corresponding to the foreground or the background, depending on the detected degree of blur of the image (S612). Moreover, contrast enhancement processing is performed on the first region where the main subject is located (S613). Therefore, in the sixth embodiment, an image of the portrait photographic tone with excellent contrast can be obtained easily in the electronic camera. Moreover, since the degree of blur of the corresponding region of the second region after image processing can be caused to be proportional to the degree of blur of the original photographic image, an image with natural degree of blur close to actual perspective can be obtained.

(2) In the sixth embodiment, since the blur enhancement process is performed depending on the detected degree of blur of the image, like the case of the technology in Patent Document 1, a special distance measuring units etc. is not required. Moreover, in the sixth embodiment, since the degree of blur of an image is detected by the compressing/expanding processing section, a special circuit and software etc. for frequency analysis are not required. Therefore, the sixth embodiment has a remarkable effect in that, by use of a substantially usual configuration of the electronic camera, an image of portrait photographic tone as mentioned above can be obtained.

(3) In the sixth embodiment, since determination etc. of the degree of blur is performed based on the moving image of which resolution (number of pixels) is lower than that of the photographic image, the amount of operation can be reduced as compared to the case where the main photographic image data is directly subjected to image processing. Moreover, in the sixth embodiment, since determination etc. of the degree of blur is performed based on the moving image obtained before generation of the photographic image data, it is also possible to perform determination of the degree of blur before generation of the main photographic image data, or while generating the main photographic image data. As mentioned above, in the sixth embodiment, since the image-processing time per one frame can be shortened in the blur enhancement mode, the interval from release to restart of shooting is shortened. Therefore, the snapshot property in the blur enhancement mode is improved, and the possibility missing photo opportunity is also reduced.

In addition, in the above description, although the configuration where processing at steps S607, S608 and S610 in FIG. 18 are performed on a moving image has been described, these processing may be performed on an image for the finder of which number of pixels is smaller than that of the main photographic image.

Moreover, in the above description, although an example of configuration which analyzes the spatial frequency components of the moving image data to change the amount of blur to be added to the main photographic image, a configuration which changes the amount of blur to be added to the moving image, may be used. Moreover, a configuration which analyzes the special frequency components of the main photographic image data or the image data for the finder to change the amount of blur to be added to the main photographic image data or the image data for the finder may be used. In this case, the "corresponding region corresponding to the second region" is the second region itself.

Description of Seventh Embodiment

Figure 20:
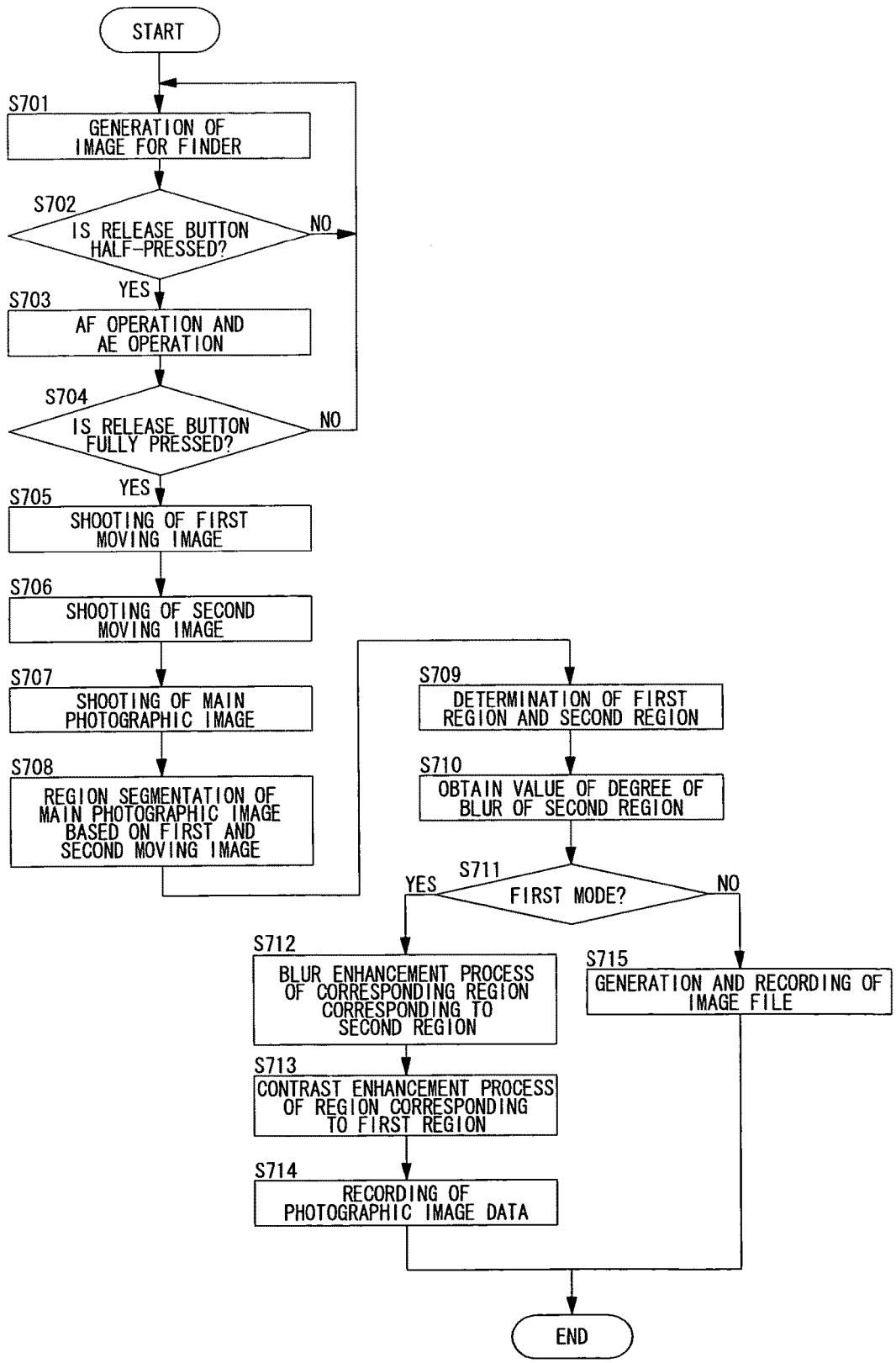
FIG. 20 is a flow chart illustrating the operation in a "blur enhancement mode" of an electronic camera of a seventh embodiment.

FIG. 20 is a flow chart illustrating the operation in a "blur enhancement mode" of an electronic camera of a seventh embodiment. Here, since the configuration of the electronic camera of the seventh embodiment is common to that of the electronic camera of the first embodiment illustrated in FIG. 1, duplicated description thereof will be omitted.

In addition, since S701 and S702 in FIG. 20 correspond to S601 to S602 in FIG. 18, respectively, and S711 to S715 in FIG. 20 correspond to S611 to S615 in FIG. 18, respectively, duplicated descriptions thereof will be omitted.

Step S703: Based on the moving image signal, the CPU 22 executes an AF operation by way of contrast detection to move a focusing lens 11b to the focusing position. Moreover, The CPU 22 executes a known exposure operation based on the moving image signal, and determines parameters (such as exposure time, an aperture value, and imaging sensitivity) of shooting conditions in main image shooting and in moving image shooting.

Step S704: The CPU 22 determines whether the release button has been fully pressed (released) by a user or not. When the release button has been released (YES side), the process proceeds to S705. On the other hand, when the release button has not been released (NO side), the process returns to S701, and the CPU 22 repeats the above operations.

Step S705: The CPU 22 images a moving image without causing the emitting section 21 to emit light. Then, based on the moving image signal after focusing, the image processing section 16 generates the data of the first moving image. In addition, the data of the first moving image is temporarily recorded on the buffer memory 15.

Step S706: Just after the shooting at S705, the CPU 22, while causing the emitting section 21 to emit light, again images a construct substantially the same as that at S705 in a moving image. Then, based on the moving image signal, the image processing section 16 generates the data of the second moving image. In addition, the data of the second moving image is also temporarily recorded on the buffer memory 15.

Step S707: The CPU 22 drives the image sensor 13 to image a subject image (main shooting of a still image) in a construction substantially the same as those at S705 and S706. Then, based on the image signal at the time of releasing, the image processing section 16 generates main photographic image data. The main photographic image data is temporarily recorded on the buffer memory 15. Moreover, the CPU 22 records temporarily photographic information (such as the position of the focusing area, set information of the scene assist function, and face recognition information), on the buffer memory 15 etc. In addition, the resolution (number of pixels) of the image of the photographic image data by way of the main shooting of the still image is set so as to be at least higher than the resolution (number of pixels) of the first moving image and the second moving image and the image for the finder.

Step S708: Based on the data of the first moving image (S705) and the second moving image (S706), the CPU 22 executes a region segmenting process of the main photographic image.

Here, at S707, the CPU 22 performs the region segmenting process on the main photographic image, based on (1) difference in brightness between the first moving image and the second moving image, or (2) ratio in brightness between the first moving image and the second moving image. In addition, since the content of the region segmenting process is substantially common to that at S303 in the third embodiment, duplicated description thereof will be omitted.

Step S709: The CPU 22 determines a main subject region (first region), and the other region (second region) from among regions segmented at S708. Similar to S103 of the first embodiment, for example, the CPU 22 determines the first region, based on the positions of a focusing area, a construct assisting frame, and a face detected by way of face recognition, and the like. Alternatively, the CPU 22 may perform spatial frequency analysis processing on any one of the first moving image, the second moving image, and the main photographic image to determine a region where the degree of blur is lowest as the first region.

Step S710: The CPU 22 obtains the degree of blur of the second region. The value of the degree of blur is used in the blur enhancement process at S712 (corresponds to S612) in order to determine the enhancement amount of the blur in the second region.

Here, the CPU 22 may obtain the value of the degree of blur of the second region by way of spatial frequency analysis. Alternatively, based on the difference value in brightness or ratio in brightness (S707) between the first moving image and the second moving image, the CPU 22 may determine the value of the degree of blur of the second region. Specifically, similar to S309 in the third embodiment, the CPU 22 compares the first moving image with the second moving image to obtain the difference value in brightness or ratio in brightness between the first region and the second region. Then, the CPU 22 determines the abovementioned value of the degree of blur depending on the difference between the difference values in brightness or the ratios in brightness. In addition, as the difference value in brightness or the ratio in brightness between the first region and the second region becomes larger, the CPU 22 sets the enhancement amount of the blur in the second region by way of image processing to be larger.

Hereinafter, the effect of the seventh embodiment will be described.

According to the seventh embodiment, similar to the above embodiments, an image of the portrait photographic tone with excellent contrast can be obtained easily. Moreover, in the seventh embodiment, based on two moving images by way of shooting with emitting light and shooting without emitting light, an image is segmented into the first region and the second region. Therefore, similar to the third embodiment, even when a field is dark, region segmentation of an image can be performed in a high accuracy. Further, in the seventh embodiment, since region segmentation is performed by comparing the two kinds of moving images, the amount of operation can be reduced as compared to the case where the main photographic image data is directly subjected to image processing.

(Supplementary Items of Embodiments)

(1) In the above-mentioned embodiments, without performing detection of the degree of blur by way of DCT transform by the compressing/expanding processing section, the detection of the degree of blur may be performed by way of other known frequency analysis such as, for example, fast Fourier transform.

(2) In the third embodiment, the order of shooting with emitting light (generation of the first image data) and shooting without emitting light (generation of the second image data) may be altered. Moreover, a configuration which adds blur to photographic image data shot without emitting light, may be used.

(3) In the present invention, the moving image used for detection etc. of the degree of blur is not limited to an image just before shooting, for example, a finder image former than the finder image just before shooting by several frames, may be used. Alternatively, a finder image generated at the time of AF operation may be directly used for detection etc. of the degree of blur.

(4) In the present invention, by performing an edge extracting process on a moving image, and, based on the extracted outline, region segmentation of the image may be performed.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. An imaging device, comprising:
   an imaging section imaging a field to generate photographic image data;
   an image segmenting section partitioning an image of said photographic image data into a first region where a main subject is located and a second region where the main subject is not included;
   a blur detecting section detecting degree of blur of the image of said second region of the image of said photographic image data; and
   a blur enhancement section performing blur enhancement processing on the image of said second region to enlarge the degree of blur of the image after image processing, depending on the magnitude of the detected degree of blur of the image.

2. The imaging device according to claim 1, further comprising:
   a lens information obtaining section obtaining focal-length information of a lens of said imaging section; and
   a blur adjusting section adjusting the degree of blur of the image in said second region, depending on said focal-length information.

3. The imaging device according to claim 1, further comprising:
   a blur adjusting section detecting a size of a subject in said second region and adjusting the degree of blur of the image of said second region depending on the size of said subject.

4. The imaging device according to claim 1, wherein said image segmenting section, based on at least one of position information of a focusing area selected at the time of shooting and information of a construct assisting frame used for positioning a main subject at the time of shooting, specifies the position of said main subject.

5. The imaging device according to claim 1, wherein said image segmenting section, based on said degree of blur, further segments the image of said second region into a plurality of regions; and
   said blur enhancement section performs said blur enhancement processing independently on an image of each of the segmented regions, respectively.

6. The imaging device according to claim 1, wherein said blur detecting section further includes an analyzing section performing spatial frequency analysis of said image, and detects the degree of blur of said image at said second region by way of the spatial frequency analysis by the analyzing section.

7. The imaging device according to claim 6, further comprising:
   a compression section compressing data of said image based on the result of the spatial frequency analysis of said analyzing section; and
   a recording section recording the compressed data output from the compression section.

8. The imaging device according to claim 6, further comprising:
   an edge extracting section extracting an edge portion in the image of said photographic image data; wherein
   said blur detecting section, based on the result of the spatial frequency analysis for said edge portion, detects the degree of blur of said image at said second region.

9. The imaging device according to claim 1, further comprising an emitting section emitting light toward a field, wherein:
   said imaging section generates first photographic image data shot with emitting light, and second photographic image data shot without emitting light; and
   said image segmenting section, based on at least one of a difference in brightness and a ratio of brightness between said first photographic image data and said second photographic image data, partitions an image of said first photographic image data or an image of said second photographic image data into said first region and said second region.

10. The imaging device according to claim 9, further comprising a lightness correcting section increasing lightness of the image of said second region.

11. The imaging device according to claim 9, further comprising a noise reduction section reducing noise of the image of said second region.

12. The imaging device according to claim 1, further comprising a contrast enhancement processing section enhancing contrast of the image of said first region.

13. An image processing device, comprising:
    a data reading section reading preliminarily generated photographic image data from outside;
    an image segmenting section partitioning an image of said photographic image data into a first region where a main subject is located and a second region where the main subject is not included;
    a blur detecting section detecting degree of blur of an image of said second region of the image of said photographic image data; and
    a blur enhancement section performing blur enhancement processing on the image of said second region to enlarge the degree of blur of the image after image processing, depending on the magnitude of the detected degree of blur of the image.

14. A non-transitory computer-readable medium having stored thereon a program having instructions for causing an image processing device having a data reading section and a controlling section to execute the operations of:
    causing said data reading section to read preliminarily generated photographic image data;
    partitioning an image of said photographic image data into a first region where a main subject is located and a second region where the main subject is not included;
    detecting degree of blur of the image of said second region of the image of said photographic image data; and
    performing blur enhancement processing on the image of said second region to enlarge the degree of blur of the image after image processing, depending on the magnitude of the detected degree of blur of the image.

15. An image processing device, comprising:
    a data reading section reading an image file from out side, said image file being configured by associating preliminarily generated photographic image data with attached information indicating a first region where a main subject is located and a second region where the main subject is not included, in an image of the photographic image data;

a blur detecting section detecting degree of blur of an image of said second region of the image of said photographic image data; and a blur enhancement section performing blur enhancement processing on the image of said second region to enlarge the degree of blur of the image after image processing depending on magnitude of the detected degree of blur of the image.

16. A non-transitory computer-readable medium having stored thereon a program having instructions for causing an image processing device having a data reading section and a controlling section to execute the operations of:

causing said data reading section to read an image file from outside, said image file being configured by associating preliminarily generated photographic image data with attached information indicating a first region where a main subject is located and a second region where the main subject is not included, in an image of the photographic image data;

detecting degree of blur of an image of said second region of the image of said photographic image data; and performing blur enhancement processing on the image of said second region to enlarge the degree of blur of the image after image processing depending on magnitude of the detected degree of blur of the image.

17. An imaging device comprising:

an imaging section imaging a field to generate photographic image data;

an image segmenting section calculating a spatial frequency component over an entire region of a photographic image of one frame obtained by said imaging section; partitioning the photographic image of one frame into a first region that is a main subject region and a second region where the main subject is not included, to obtain region segmentation information based on a comparison result when the calculated spatial frequency component is compared with a predetermined value; and segmenting the image of said photographic image data based on the region segmentation information; and an image processing section performing processing on the photographic image data of the regions segmented by said image segmenting section.

18. The imaging device according to claim 17, wherein said imaging section images a field to generate main photographic image data at the time of releasing, and generates moving image data at the time of waiting said main imaging; and said image segmenting section obtains region segmentation information based on said moving image data.

19. The imaging device according to claim 18, wherein said image segmenting section obtains said region segmentation information based on the moving image data generated just before said main shooting.

20. The imaging device according to claim 18, further comprising a compression circuit compressing data amount of the main photographic image data imaged at the time of said main shooting, wherein said image segmenting section calculates the spatial frequency component of said moving image using said compression circuit.

21. The imaging device according to claim 18, wherein:

said image processing section, based on the spatial frequency component of the image of said second region in said moving image data, determines degree of blur of the image of the region; and, depending on magnitude of the degree of blur, suppresses a high spatial frequency component of said corresponding region so as to enlarge the degree of blur of the image of the corresponding region of said main photographic image data corresponding to the second region of said moving image data.

22. The imaging device according to claim 21, wherein:

said image segmenting section, based on the spatial frequency component of the image of said second region in said moving image data, further segments the image of the region into a plurality of regions; and said image processing section performs suppressing process of said high spatial frequency independently on a plurality of corresponding regions of said main photographic image data corresponding to each of the plurality of segmented second regions of said moving image data, respectively.

23. The imaging device according to claim 21, further comprising a contrast enhancement processing section enhancing contrast of regions except for said corresponding regions.

24. An imaging device, comprising:

an imaging section imaging a field to generate main photographic image data at the time of releasing and generating moving image data at the time of waiting main shooting;

a region specifying section, based on said moving image data, specifying a main subject region containing a main subject and a background region other than that, of said main photographic image;

an image processing section performing image processing on said main photographic image data different from each other between said main subject region and said background region; and an emitting section emitting light toward a field, wherein:

said imaging section generates data of a first moving image and a second moving image having emitting states of said emitting section different from each other; and said region specifying section, based on at least one of the difference in brightness and the ratio in brightness between said first moving image and said second moving image, specifies said main subject region and said background region in said main photographic image.

* * * * *